United States Patent
Shigematsu

(10) Patent No.: US 9,916,740 B2
(45) Date of Patent: Mar. 13, 2018

(54) SIGNAL DISPLAY LAMP

(71) Applicant: PATLITE CORPORATION, Osaka (JP)

(72) Inventor: Daisuke Shigematsu, Osaka (JP)

(73) Assignee: PATLITE CORPORATION (JP)

( * ) Notice: Subject to any disclaimer, the term of this patent is extended or adjusted under 35 U.S.C. 154(b) by 0 days.

(21) Appl. No.: 15/114,879

(22) PCT Filed: Jan. 20, 2015

(86) PCT No.: PCT/JP2015/051371
§ 371 (c)(1),
(2) Date: Jul. 28, 2016

(87) PCT Pub. No.: WO2015/115248
PCT Pub. Date: Aug. 6, 2015

(65) Prior Publication Data
US 2016/0351024 A1    Dec. 1, 2016

(30) Foreign Application Priority Data

Jan. 31, 2014   (JP) ................................. 2014-017577

(51) Int. Cl.
G08B 5/36     (2006.01)
(52) U.S. Cl.
CPC ...................... *G08B 5/36* (2013.01)
(58) Field of Classification Search
CPC ........................................................ G08B 5/36
See application file for complete search history.

(56) References Cited

U.S. PATENT DOCUMENTS

| | | | |
|---|---|---|---|
| 2006/0092098 A1 | 5/2006 | Yokota et al. | |
| 2011/0140898 A1* | 6/2011 | Berke | G08B 5/36 340/584 |
| 2017/0162007 A1* | 6/2017 | Boyd | G08B 5/36 |

FOREIGN PATENT DOCUMENTS

| | | |
|---|---|---|
| JP | 1983048097 A | 3/1983 |
| JP | 1985057388 A | 4/1985 |

(Continued)

OTHER PUBLICATIONS

English description dated Feb. 1, 1991 of corresponding document JP11991010826 U.

(Continued)

*Primary Examiner* — Patrick Edouard
*Assistant Examiner* — Eboni Hughes
(74) *Attorney, Agent, or Firm* — Plumsea Law Group, LLC

(57) ABSTRACT

A signal display lamp is provided that is capable of performing display in diverse modes and hence capable of increasing the quantity of transmittable information and capable of improving the reliability of information transmission. The signal display lamp includes a display portion that is capable of performing display in a plurality of display colors and that is capable of changing a position or a size of a display region in each display color, a display color determining means for determining the display color based on first information, a display region determining means for determining a position or a size of a display region in a display color determined by the display color determining means based on second information, and a display portion control means for controlling the display portion based on a display color determined by the display color determining means and based on a position or a size of a display region determined by the display region determining means.

18 Claims, 16 Drawing Sheets

(56) References Cited

FOREIGN PATENT DOCUMENTS

| JP | 11991010826 U | 2/1991 |
| JP | 1992309818 A | 11/1992 |
| JP | 2004062653 A | 2/2004 |
| JP | 2006230738 A | 9/2006 |

OTHER PUBLICATIONS

English description dated Apr. 3, 1985 of corresponding document JP1985057388 A.
English description dated Mar. 19, 1983 of corresponding document JP1983048097 A.
English description dated Sep. 7, 2006 of corresponding document JP2006230738 A.
English description dated Nov. 2, 1992 of corresponding document JP1992309818 A.
English description dated Feb. 26, 2004 of corresponding document JP2004062653 A.
International Preliminary Report on Patentability dated Aug. 11, 2016 in PCT Patent Application No. PCT/JP2015/051371 dated Jan. 20, 2015.
Extended European Search Report dated Sep. 11, 2017 for European Patent Application No. 15742773.3 (11pp).

* cited by examiner

FIG. 4

| LIQUID-LEVEL HEIGHT REGION | LIQUID-LEVEL HEIGHT THRESHOLD VALUE |
|---|---|
| R5 | |
| | HB(4) |
| R4 | |
| | HB(3) |
| R3 | |
| | HB(2) |
| R2 | |
| | HB(1) |
| R1 | |

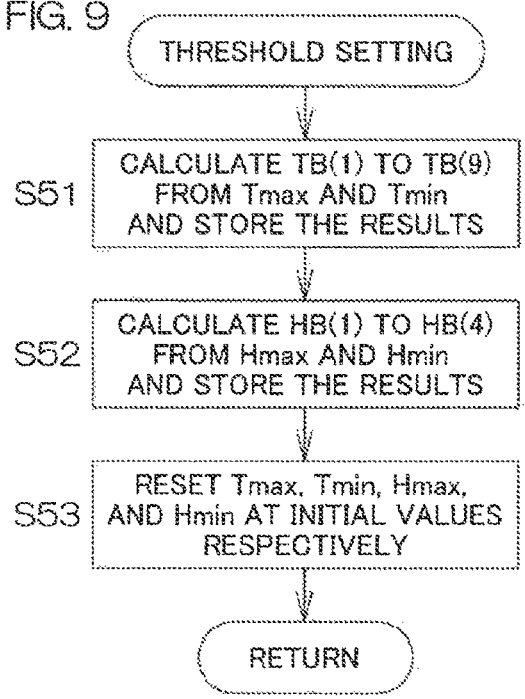

TEMPERATURE: HIGH
LIQUID LEVEL: HIGH

TEMPERATURE: LOW
LIQUID LEVEL: HIGH

TEMPERATURE: LOW
LIQUID LEVEL: LOW

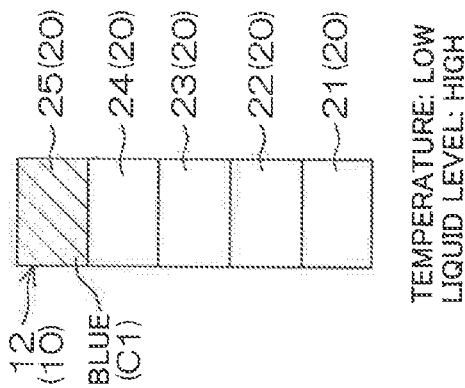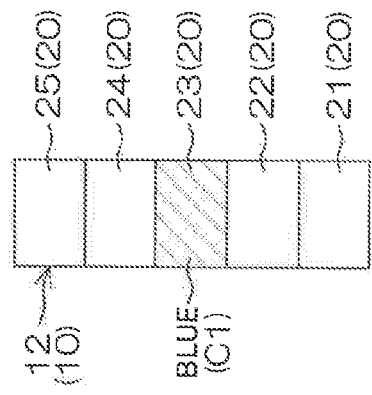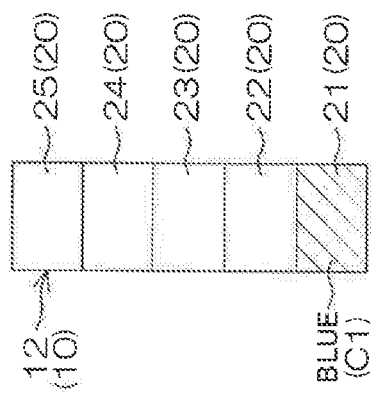

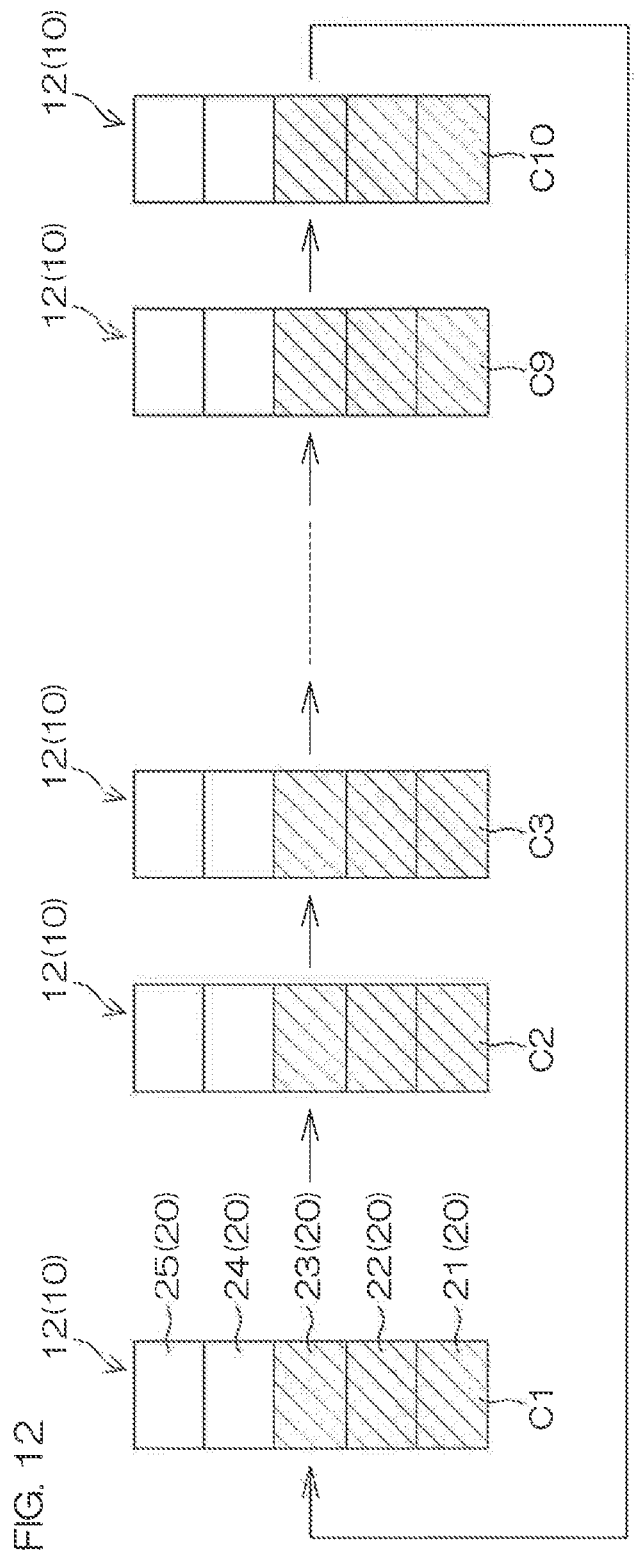

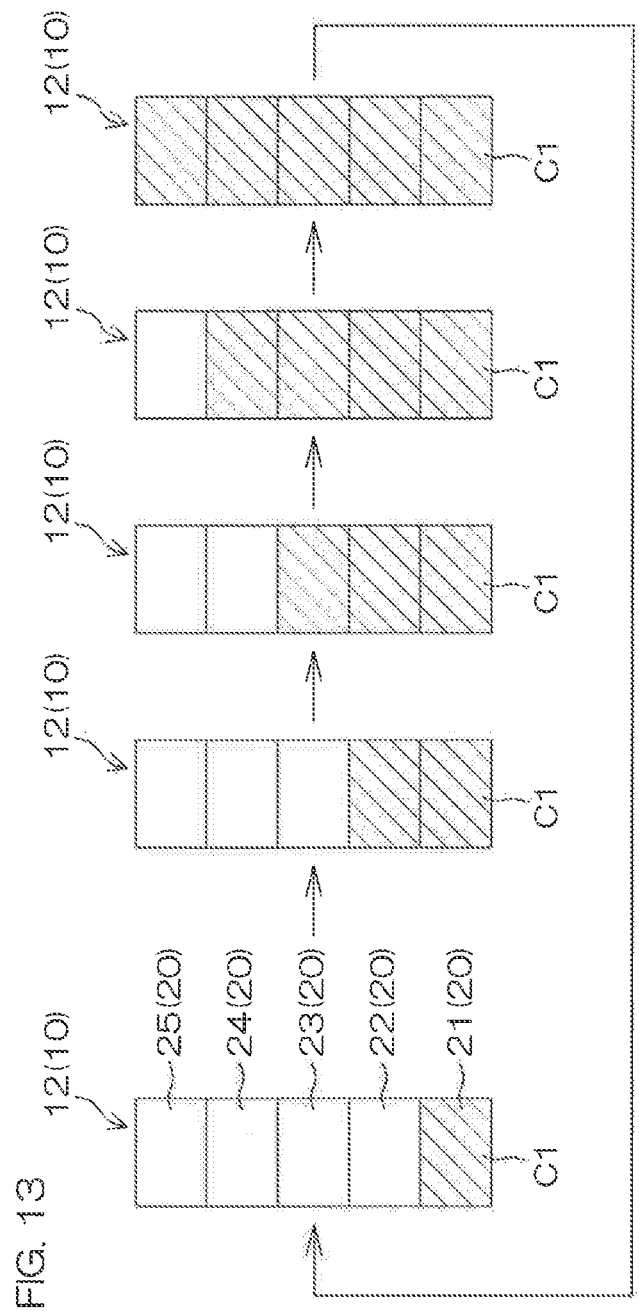

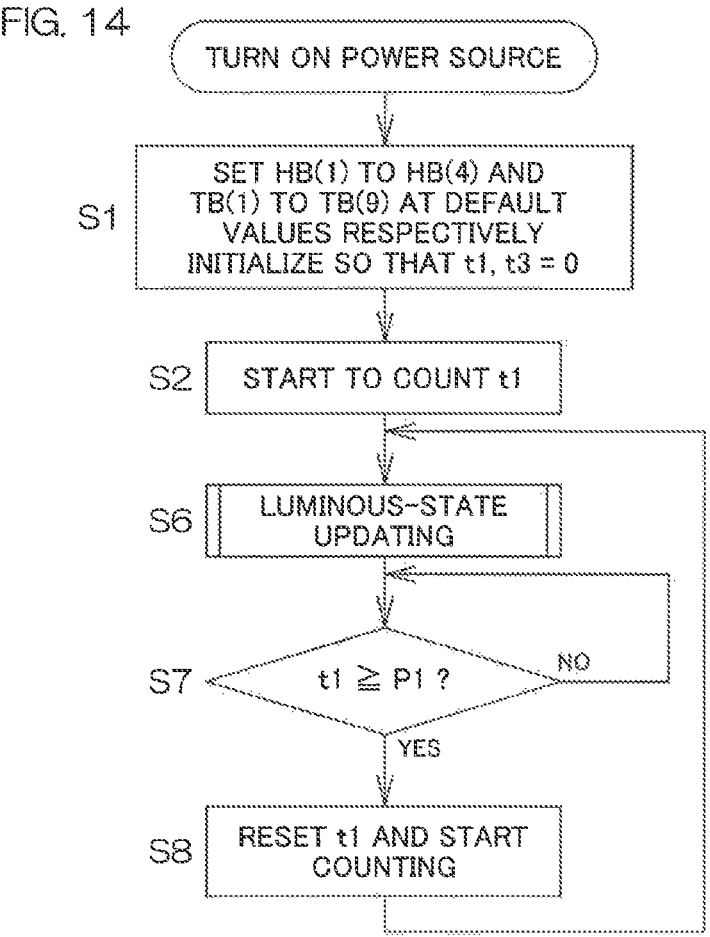

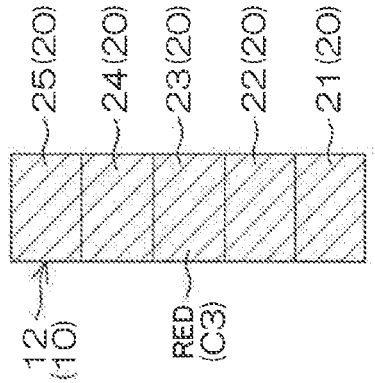
FIG. 16C    LIQUID LEVEL: HIGH
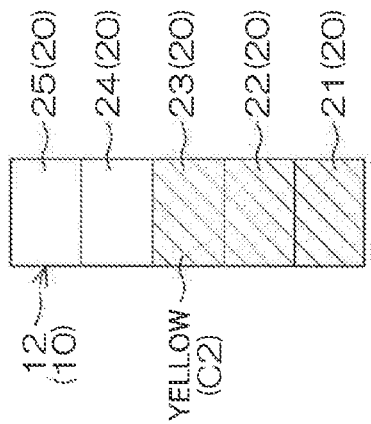
FIG. 16B    LIQUID LEVEL: INTERMEDIATE
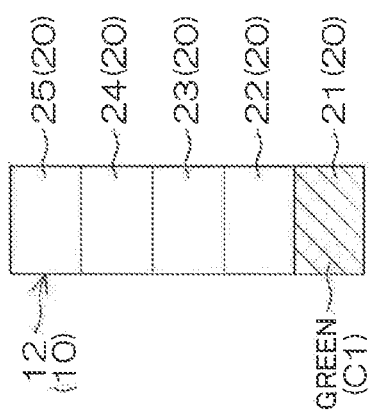
FIG. 16A    LIQUID LEVEL: LOW

SIGNAL DISPLAY LAMP

BACKGROUND OF THE INVENTION

1. Field of the Invention

The present invention relates to a signal display lamp that includes a display portion capable of performing display in a plurality of colors.

2. Background Art

Patent Literature 1 discloses a level meter that has a basic structure as a signal display lamp. This level meter includes a plurality of light sources that are arranged in a line in an up-down direction, a plurality of globes with which the plurality of light sources are respectively covered, and a lighting control circuit that turns on/off each of the plurality of light sources. A plurality of luminous divisions are formed by respectively combining the light sources and the globes together. An output signal of a liquid quantity sensor that detects the quantity of liquid in a water tank is input to a programmable controller, and the programmable controller converts the output signal of the liquid quantity sensor into BCD (binary-coded decimal) data. The BCD data is input to the lighting control circuit. The lighting control circuit selects a luminous division that is to emit light based on the BCD data, and allows a light source of the luminous division selected thereby to be lit. Accordingly, a level display corresponding to the output of the liquid quantity sensor is performed. It is possible to perform an alarm display according to a liquid quantity level, for example, by color-coding such that, in order from the bottom side, a globe having a predetermined number of luminous divisions is set in green, and a globe having a predetermined number of luminous divisions above the green globe is set in yellow, and a globe having a predetermined number of luminous divisions above the yellow globe is set in red.

One Prior Art Document is Patent Literature 1: Japanese Patent Application Publication No. 4-309818.

SUMMARY OF THE INVENTION

Although Patent Literature 1 discloses an arrangement to display information by the number of luminous divisions or by luminous colors, the luminous color of each luminous division is fixed by the color of a globe. Therefore, conventional problems reside in the fact that diversity in display is not necessarily sufficient, and the quantity of information that is transmittable to users is small, or the reliability of information transmission is insufficient.

Therefore, an object of the present invention is to provide a signal display lamp that is capable of performing display in more diverse modes and hence capable of increasing the quantity of transmittable information and capable of improving the reliability of information transmission.

The present invention provides a signal display lamp that includes a display portion capable of performing display in a plurality of display colors and capable of changing a position or a size of a display region in each display color, a display color determining means for determining the display color based on first information, a display region determining means for determining a position or a size of a display region in a display color determined by the display color determining means based on second information, and a display portion control means for controlling the display portion based on a display color determined by the display color determining means and based on a position or a size of a display region determined by the display region determining means.

The display portion may have a plurality of luminous divisions. For example, the display portion may be formed such that the luminous divisions can emit light in a plurality of colors, respectively, and such that the luminous divisions can each controllably emit light. In this arrangement, the position or the size of a display region in a determined luminous color can be changed by individually determining the luminous colors of the respective luminous divisions. The plurality of luminous divisions may be linearly arranged, for example, in a predetermined alignment direction, and may form a pillar-shaped display portion. In this case, the display position in a display color may be fixed at either position in the alignment direction, or the length of a display region in a display color may be expanded or contracted in the alignment direction.

In one preferred embodiment of the present invention, the first information is information that represents first properties of an object to be monitored, and the second information is information that represents second properties of the object to be monitored. The signal display lamp of the present preferred embodiment displays the first and second properties concerning the same object to be monitored. Examples of properties include the physical quantity of an object to be monitored, the nature of an object to be monitored, the type of an object to be monitored, etc.

In one preferred embodiment of the present invention, the first information is a first physical quantity, and the second information is a second physical quantity that differs in kind from the first physical quantity. The signal display lamp of the present preferred embodiment displays two physical quantities that differ in kind from each other.

In one preferred embodiment of the present invention, at least one of the first physical quantity and the second physical quantity is a physical quantity detected by a sensor. Both of the first and second physical quantities may be physical quantities detected by sensors, or only one of the first and second physical quantities may be a physical quantity detected by a sensor. Examples of physical quantities detected by the sensor can include temperature, humidity, pressure, power magnitude, power direction, weight, torque, volume, liquid-level height, flow rate, distance, speed, acceleration, time period, sound volume, sound pressure, data amount, etc.

In one preferred embodiment of the present invention, the first physical quantity is the temperature of a liquid detected by a temperature sensor, and the second physical quantity is a liquid level (liquid-level height) of the liquid detected by a liquid level sensor. The signal display lamp of the present preferred embodiment displays the temperature and the liquid level (liquid quantity) of a liquid that is the same object to be monitored. For example, the temperature and the liquid level (liquid quantity) of a liquid stored in a tank may be displayed.

In one preferred embodiment of the present invention, the signal display lamp additionally includes a signal input interface that converts an output signal of the sensor into a physical quantity and that delivers the physical quantity to the display color determining means and to the display region determining means, and, in the thus arranged signal display lamp, the signal input interface, the display color determining means, and the display region determining means are included in an add-on unit attachable to and detachable from the signal display lamp. As a result of attaching the add-on unit, the signal display lamp of the present preferred embodiment is capable of, in a retrofitting manner, adding a function to determine a display color based on the first information, and to determine the position or the size of a display region in the display color determined thereby based on the second information, and to perform display. In other words, such a function can be added when needed.

In one preferred embodiment of the present invention, the display color determining means is a means for making a comparison between the first physical quantity and a display color switching threshold value and for determining a display color based on a result obtained through the comparison, and the display region determining means is a means for making a comparison between the second physical quantity and a display region changing threshold value and for determining a position or a size of a display region by a display color determined by the display color determining means based on a result obtained through the comparison. The signal display lamp of the present preferred embodiment determines a display color corresponding to the first physical quantity by a comparison with a display color switching threshold value, and determines a display region corresponding to the second physical quantity by a comparison with a display region changing threshold value. Accordingly, an objective display according to the first and second physical quantities is achieved.

The display color switching threshold value may be a single threshold value or may be a plurality of threshold values. Likewise, the display region changing threshold value may be a single threshold value or may be a plurality of threshold values. Variously diversified displays can be performed by providing a plurality of threshold values.

In one preferred embodiment of the present invention, the signal display lamp additionally includes a display color threshold updating means for periodically updating the display color switching threshold value with a predetermined display color threshold updating period based on a maximum value and a minimum value of the first physical quantity during the display color threshold updating period. The signal display lamp of the present preferred embodiment updates a display color switching threshold value in accordance with the maximum value and the minimum value of the first physical quantity with a predetermined display color threshold updating period. Accordingly, it is possible to realize display according to a recent change in the first physical quantity.

In one preferred embodiment of the present invention, the signal display lamp additionally includes a display region threshold updating means for periodically updating the display region changing threshold value with a predetermined display region threshold updating period based on a maximum value and a minimum value of the second physical quantity during the display region threshold updating period. The signal display lamp of the present preferred embodiment updates a display region changing threshold value in accordance with the maximum value and the minimum value of the second physical quantity with a predetermined display region threshold updating period. Accordingly, it is possible to realize display according to a recent change in the second physical quantity.

In one preferred embodiment of the present invention, when the first physical quantity reaches a predetermined value in a first alert range, the display color determining means circulatorily selects a plurality of display colors and periodically changes the display colors, and, when the second physical quantity reaches a predetermined value in a second alert range, the display region determining means periodically changes a position or a size of a display region by a display color determined by the display color determining means. The signal display lamp of the present preferred embodiment is capable of displaying alerts (warnings) with respect to the first physical quantity and the second physical quantity, respectively. The first physical quantity is represented by a display color, and therefore its alert display is represented by a circulatory change in display color. The second physical quantity is represented by the position or the size of a display region, and therefore its alert display is represented by a circulatory change in position or in size of the display region. The first alert range may be defined by use of a first alert threshold value fixed in accordance with the first physical quantity. Likewise, the second alert range may be defined by use of a second alert threshold value fixed in accordance with the second physical quantity.

In one preferred embodiment of the present invention, the first information is information that indicates whether a physical quantity is a value within a predetermined range, and the second information is information that indicates largeness or smallness of the physical quantity. The signal display lamp of the present preferred embodiment changes a display color in accordance with whether a physical quantity is a value within a predetermined range, and, on the other hand, changes the position or the size of a display region in a display color in accordance with the largeness or smallness of the physical quantity.

According to the present invention, the display portion has an arrangement in which display is capable of being performed in a plurality of colors, and the position or the size of a display region having each display color is capable of being variably set. Additionally, the display color is determined in accordance with the first information, and the position or the size of the display region by the display color thus determined is determined in accordance with the second information. The display portion is controlled based on the display color and the position or the size of the display region thus determined. Therefore, it is possible to represent the first information by means of a display color, and is possible to represent the second information by means of the position or the size of the display region. Moreover, the display region of each display color is variable in its position or in its size, and therefore various display modes are achievable. Accordingly, it is possible to increase the quantity of transmittable information, and is possible to improve the reliability of information transmission.

The aforementioned or other objects, features, and advantages of the present invention will become apparent from the following description of preferred embodiments with reference to the attached drawings.

BRIEF DESCRIPTION OF THE DRAWINGS

FIG. 4 is a diagram to describe the generation of display region data by means of the signal conversion unit.

FIG. 9 is a flowchart to describe a concrete example of threshold setting.

FIG. 11A, FIG. 11B, and FIG. 11C show another example of display by means of the signal display lamp.

FIG. 12 shows an example of an alert display by means of the signal display lamp, in which the temperature has reached an alert range.

FIG. 13 shows an example of an alert display by means of the signal display lamp, in which the liquid-level height has reached an alert range.

FIG. 14 is a flowchart to describe processing in a signal display lamp according to another preferred embodiment of the present invention.

FIG. 16A, FIG. 16B, and FIG. 16C are views to describe an example of display of a signal display lamp according to still another preferred embodiment of the present invention.

PREFERRED EMBODIMENTS OF THE INVENTION

Figure 1:
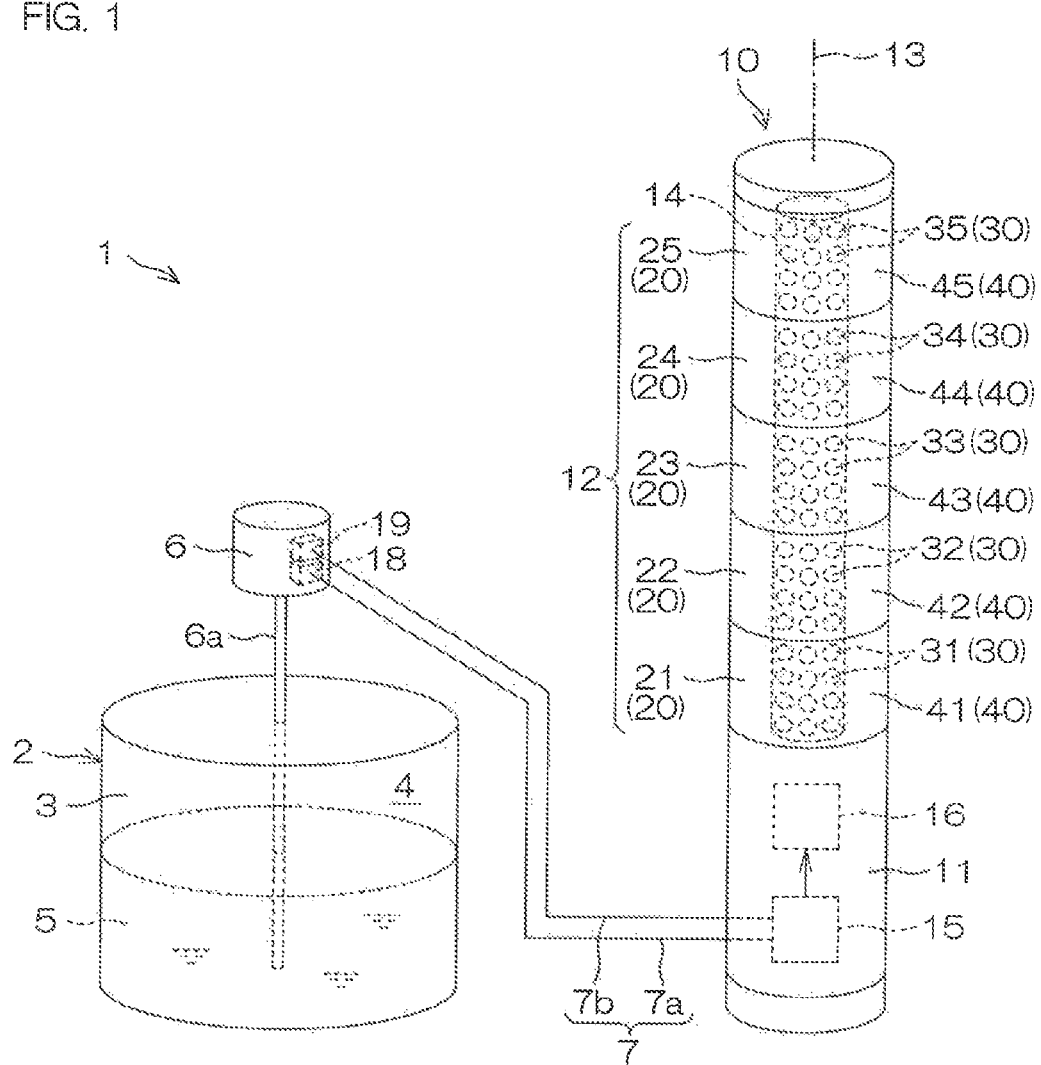
FIG. 1 is a system configuration diagram showing a configuration of a liquid monitoring system that uses a signal display lamp according to a preferred embodiment of the present invention.

FIG. 1 is a system configuration diagram showing a configuration of a liquid monitoring system that uses a signal display lamp according to a preferred embodiment of the present invention.

The liquid monitoring system 1 is arranged so as to monitor the state of a liquid 5 stored in a liquid tank 2 and to impart the state of the liquid 5 to surroundings by means of the signal display lamp 10. The liquid tank 2 defines a liquid containing space 4 in its inside surrounded by an opaque outer shell 3, for example. The liquid 5 is stored in the liquid containing space 4. A new liquid may be introduced into the liquid tank 2 from the outside. Additionally, the liquid 5 stored in the liquid tank 2 may be taken out to the outside and may be used. Still additionally, for a predetermined objective, such as fermentation or ripening, the liquid 5 in the liquid tank 2 may be held as it is.

A sensor unit 6 is provided in order to detect the state of the liquid 5 stored in the liquid tank 2. In the present preferred embodiment, a temperature sensor 18 that detects the temperature of the liquid 5 stored in the liquid tank 2 and a liquid surface sensor (liquid level sensor) 19 that detects the liquid surface height (liquid quantity) of the liquid 5 stored in the liquid tank 2 are incorporated into the sensor unit 6. The sensor unit 6 may have a detection probe 6a that droops toward the liquid 5 in the liquid tank 2. The liquid surface height and the liquid temperature of the liquid 5 are examples of different physical quantities showing the state of the liquid 5 stored in the liquid tank 2. An output signal of the sensor unit 6 is input to the signal display lamp 10 through signal wires 7.

The signal display lamp 10 has a pillar-shaped basic form as a whole. The signal display lamp 10 has a base portion 11 and a display portion 12. The base portion 11 has a pillar shape (typically, cylindrical shape), and is attached to, for example, an appropriate place in a factory. The display portion 12 is coupled with the upper end of the base portion 11. The display portion 12 is formed in a pillar shape. Typically, the display portion 12 is formed in a pillar shape (for example, cylindrical shape) that matches in size and in contour with the base portion 11. In the present preferred embodiment, the display portion 12 is formed such that a plurality of luminous divisions 21 to 25 (referred to generically as a "luminous division 20") are arranged in a straight line in a direction (for example, up-down direction) along an axis 13. Each luminous division 20 includes a light source 31-35 (referred to generically as a "light source 30") capable of emitting light in a plurality of colors and a cylindrical globe (for example, a circularly cylindrical globe) 41-45 (referred to generically as a "globe 40") with which the surrounding of the light source 30 is covered. In the present preferred embodiment, the globes 40 are colorless and transparent, and allows the light sources 30 to emit light outwardly without changing the color of the light. The globe 40 may include a lens that refracts or diffuses light emitted by the light source 30 and that is formed integrally with its inner surface or its outer surface.

A signal conversion unit 15 and a display portion control unit 16 are contained in the base portion 11. The signal conversion unit 15 converts an output signal of the sensor unit 6 into digital data, and furthermore generates light emission control data to control the luminous division, and delivers these pieces of data to the display portion control unit 16. In the present preferred embodiment, the signal conversion unit 15 is arranged so as to be detachably attached to the base portion 11. In other words, the signal conversion unit 15 has the form of an add-on unit that is later attachable to the signal display lamp 10. The display portion control unit 16 controls the display portion 12. Specifically, the display portion control unit 16 has a function to individually control the luminous color and the turn-on/turn-off of each of the luminous divisions 20 forming the display portion 12. Accordingly, display that is variable in size or in position of a display region in a plurality of display colors is arranged so as to be achievable in the display portion 12.

The plurality of light sources 30 that correspond to the plurality of luminous divisions 20, respectively, may be held on a wiring board 14 that integrally extends along the axis 13 over the luminous divisions 20. Additionally, light sources 30 corresponding to a plurality of wiring boards separated from each other correspondingly to the luminous divisions 20, respectively, may be mounted. In the example of FIG. 1, the wiring board 14 is cylindrically formed. The thus formed cylindrical wiring board 14 may be formed by combining a plurality of long rectangular wiring boards together.

Each light source 30 may, in detail, include a light emitting diode. Each light source 30 may be formed of a full-color light emitting diode unit in which light emission portions of a plurality of colors (preferably, three primary colors such as red, green, and blue) are incorporated into one package. Additionally, each light source 30 may include a plurality of individual light emitting diode elements that generate light of a plurality of colors (preferably, three primary colors such as red, green, and blue), respectively. In any of those arrangements, it is possible to form a multicolor (or full-color) light-emission-type light source unit that is capable of emitting light in a plurality of colors by allowing light emission portions or light emitting diode elements to emit light individually and independently or by combining light emission portions or light emitting diode elements together and allowing a resulting combination to emit light.

Figure 2:
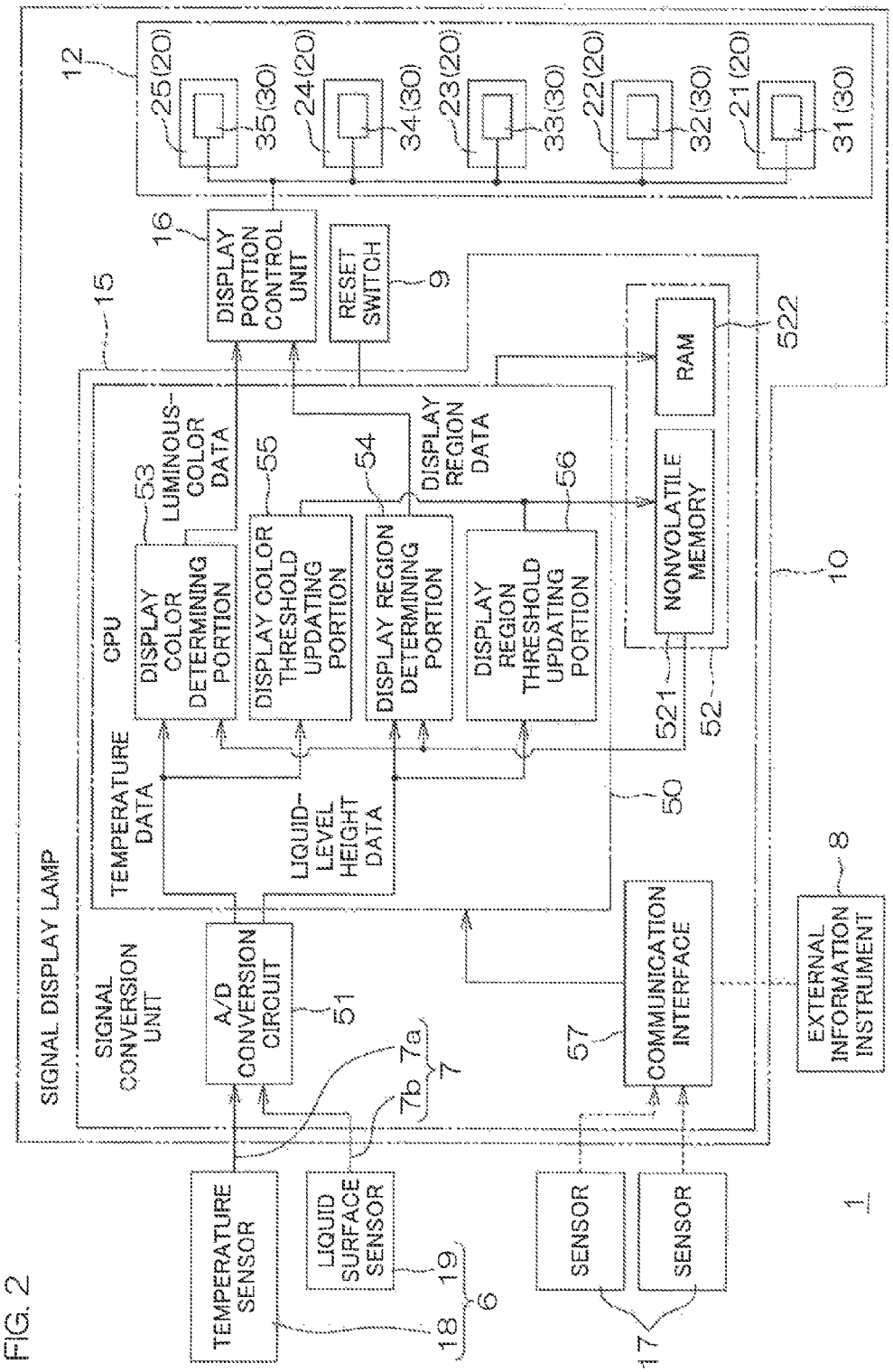
FIG. 2 is a block diagram to describe an electric configuration of the liquid monitoring system.

FIG. 2 is a block diagram to describe an electric configuration of the liquid monitoring system 1. Output signals (sensor signals) of the temperature sensor 18 and the liquid surface sensor 19 of which the sensor unit 6 is composed are input to the signal conversion unit 15 through the signal wires 7a and 7b. Based on sensor signals input thereto, the signal conversion unit 15 converts those signals into light emission control data that shows the luminous color and the turn-on/turn-off of each luminous division 20 forming the display portion 12. This light emission control data is input to the display portion control unit 16. According to the light emission control data, the display portion control unit 16 controls the luminous state (luminous color and turn-on/turn-off) of each light source 30.

The signal conversion unit 15 includes, for example, an A/D conversion circuit 51, a CPU (central processing unit) 50, and a memory 52. The A/D conversion circuit 51 converts analog sensor signals given from the temperature sensor 18 and from the liquid surface sensor 19 into digital data. The memory 52 may include a nonvolatile memory 521, such as EEPROM (electronically erasable and programmable read only memory), and a RAM (random-access memory) 522. Execution programs executed by the CPU 50 and various control parameters are stored in the nonvolatile memory 521. The CPU 50 executes the execution programs stored in the nonvolatile memory 521 while using the storage area of the RAM 522 as a work area, thus functioning as a plurality of function processing portions. Accordingly, sensor signals output by the temperature sensor 18 and the liquid surface sensor 19 are converted into light emission control data as mentioned above.

The plurality of function processing portions achieved by the execution of the execution programs by the CPU include a display color determining portion 53, a display region determining portion 54, a display color threshold updating portion 55, and a display region threshold updating portion 56. It should be noted that these function processing portions are conceptual divisions, and the CPU 50 is not required to be physically divided into these function processing portions, and the execution programs executed by the CPU 50 are also not required to have divisions corresponding to the function processing portions.

The display color determining portion 53 has a function to generate luminous color data to determine a luminous color (display color) based on a temperature detected by the temperature sensor 18. The display region determining portion 54 has a function to generate display region data to determine the position or the size of a display region by a display color determined by the display color determining portion 53 based on a liquid-level height (liquid quantity) detected by the liquid surface sensor 19. The display color threshold updating portion 55 has a function to periodically update a temperature threshold value that is compared with a temperature in order to determine a luminous color. The display region threshold updating portion 56 has a function to periodically update a liquid-level height threshold value that is compared with a liquid-level height in order to determine the position or the size of a display region.

The signal conversion unit 15 may include a communication interface 57 when needed. The communication interface 57 may be connected to, for example, one or more other sensors 17 through a wired network or a wireless network. The other sensor 17 may be, for example, a sensor that detects the state of a liquid contained in another tank disposed at another place. Additionally, an external information instrument 8 may be connected (in a wired or wireless manner) through the communication interface 57. Accordingly, for example, programs stored in the nonvolatile memory 521 may be updated, or various control parameters stored therein may be changed. The external information instrument 8 may be a computer into which a dedicated tool (software) is incorporated.

A reset switch 9 may be connected to the CPU 50. The reset switch 9 is, for example, an operation switch that is operated by a user in order to cancel an alert display when the alert display is given.

Figure 3:
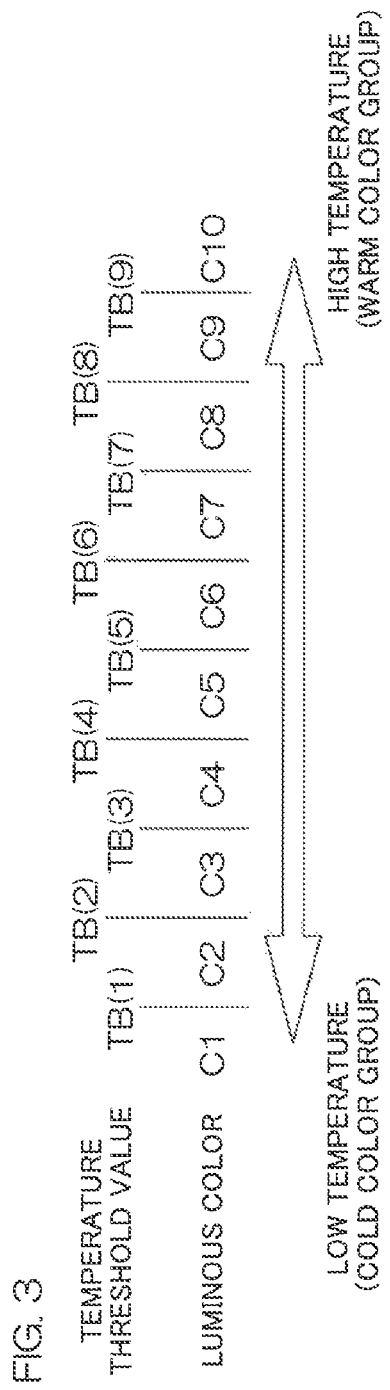
FIG. 3 is a diagram to describe the generation of luminous color data by means of a signal conversion unit.

FIG. 3 is a diagram to describe the generation of luminous color data by means of the signal conversion unit 15 (chiefly, operation of the display color determining portion 53). The signal conversion unit 15 generates luminous color data different in accordance with a temperature detected by the temperature sensor 18. Specifically, the CPU 50 compares temperature data T which is digital data converted by the A/D conversion circuit 51 with a plurality of temperature threshold values TB(1), TB(2), TB(3), TB(4), TB(5), TB(6), TB(7), TB(8), and TB(9) (wherein TB(1)<TB(2)<TB(3)<TB(4)<TB(5)<TB(6)<TB(7)<TB(8)<TB(9)). Then, if the temperature data T is less than the first temperature threshold value TB(1), luminous color data that indicates a first luminous color C1 is generated. If the temperature data T is equal to or more than the first temperature threshold value TB(1) and is less than the second temperature threshold value TB(2), luminous color data that indicates a second luminous color C2 is generated. Likewise, if the temperature data T is equal to or more than the second temperature threshold value TB(2) and is less than the third temperature threshold value TB(3), luminous color data that indicates a third luminous color C3 is generated. If the temperature data T is equal to or more the third temperature threshold value TB(3) and is less than the fourth temperature threshold value TB(4), luminous color data that indicates a fourth luminous color C4 is generated. If the temperature data T is equal to or more than the fourth temperature threshold value TB(4) and is less than the fifth temperature threshold value TB(5), luminous color data that indicates a fifth luminous color C5 is generated. If the temperature data T is equal to or more than the fifth temperature threshold value TB(5) and is less than the sixth temperature threshold value TB(6), luminous color data that indicates a sixth luminous color C6 is generated. If the temperature data T is equal to or more than the sixth temperature threshold value TB(6) and is less than the seventh temperature threshold value TB(7), luminous color data that indicates a seventh luminous color C7 is generated. If the temperature data T is equal to or more than the seventh temperature threshold value TB(7) and is less than the eighth temperature threshold value TB(8), luminous color data that indicates an eighth luminous color C8 is generated. If the temperature data T is equal to or more than the eighth temperature threshold value TB(8) and is less than the ninth temperature threshold value TB(9), luminous color data that indicates a ninth luminous color C9 is generated. If the temperature data T is equal to or more than the ninth temperature threshold value TB(9), luminous color data that indicates a tenth luminous color C10 is generated. Luminous colors according to the temperature of the liquid 5 are determined in this way, and luminous color data that indicates a thus determined color is generated. For example, if colors are set to be determined in order from a coldest color to a warmest color correspondingly to order from the first luminous color C1 to the tenth luminous color C10, an intuitively comprehensible display can be realized.

In the present preferred embodiment, the temperature threshold values TB(1) to TB(9) are reset (updated) with a predetermined threshold updating period (for example, one day) as described later.

FIG. 4 is a diagram to describe the generation of display region data by means of the signal conversion unit 15 (chiefly, operation of the display region determining portion 54). The signal conversion unit 15 generates display region data according to a liquid-level height (liquid quantity) detected by the liquid surface sensor 19. Specifically, the CPU compares liquid-level height data H which is digital data converted by the A/D conversion circuit 51 with a plurality of liquid-level height threshold values HB(1), HB(2), HB(3), and HB(4) (wherein HB(1)<HB(2)<HB(3) <HB(4)). If the liquid-level height data H is less than the first liquid-level height threshold value HB(1), display region data that indicates a first liquid-level height region R1 is generated. If the liquid-level height data H is equal to or more than the first liquid-level height threshold value HB(1) and is less than the second liquid-level height threshold value HB(2), display region data that indicates a second liquid-level height region R2 is generated. Likewise, if the liquid-level height data H is equal to or more than the second liquid-level height threshold value HB(2) and is less than the third liquid-level height threshold value HB(3), display region data that indicates a third liquid-level height region R3 is generated. If the liquid-level height data H is equal to or more than the third liquid-level height threshold value HB(3) and is less than the fourth liquid-level height threshold value HB(4), display region data that indicates a fourth liquid-level height region R4 is generated. If the liquid-level height data H is equal to or more than the fourth liquid-level height threshold value HB(4), display region data that indicates a fifth liquid-level height region R5 is generated.

In the present preferred embodiment, the liquid-level height threshold values HB(1) to HB(4) are reset (updated) with a predetermined threshold updating period (for example, one day) as described later.

Figure 5:
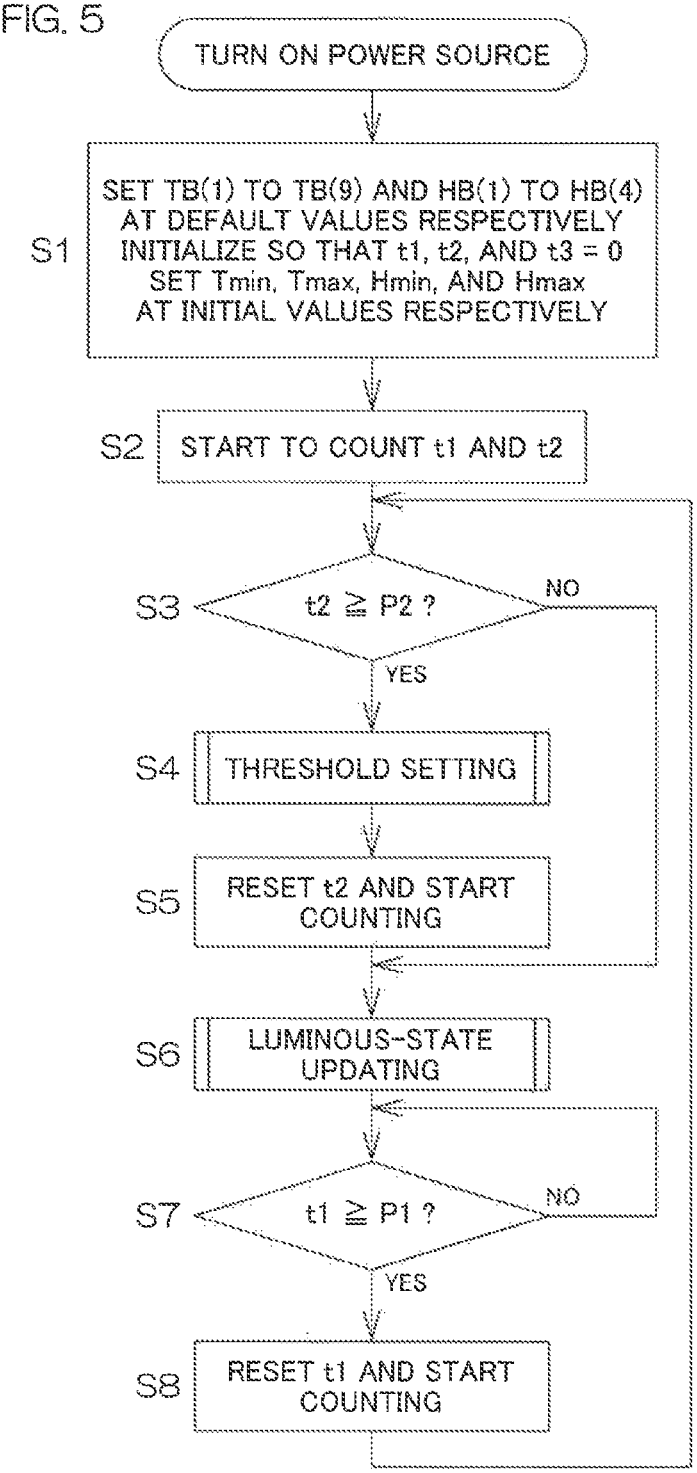
FIG. 5 is a flowchart to describe a processing example by means of a CPU of the signal conversion unit.

FIG. 5 is a flowchart to describe a processing example by means of the CPU 50 provided in the signal conversion unit 15. The processing operation of the CPU 50 is started by turning on the power source of the signal display lamp 10. First, the CPU 50 sets the temperature threshold values TB(1) to TB(9) and the liquid-level height threshold values HB(1) to HB(4) at their respective default values (Step S1). These default values of the threshold values may be pre-stored in, for example, the nonvolatile memory 521. The CPU 50 further initializes each value (counted time) of a first timer t1, a second timer t2, and a third timer t3 described later at zero. Furthermore, the CPU 50 sets initial values for the minimum temperature Tmin, the maximum temperature Tmax, the minimum liquid-level height Hmin, and the maximum liquid-level height Hmax described later, respectively.

Thereafter, the CPU 50 starts time-counting by means of the first timer t1 and the second timer t2 (Step S2). Thereafter, the CPU 50 determines whether the value (counted time) of the second timer t2 has reached the threshold updating period P2 (for example, one day) (Step S3). If the value of the second timer t2 has reached the threshold updating period P2 (Step S3: YES), threshold setting (Step S4) is performed. The threshold setting denotes processing in which the temperature threshold values TB(1) to Tb(9) and the liquid-level height threshold values HB(1) to HB(4) are set newly. After completing the threshold setting (Step S4), the CPU 50 resets the value of the second timer t2 at the initial value (for example, zero), and restarts time-counting by means of the second timer t2 (Step S5). On the other hand, if the value of the second timer t2 has not reached the threshold updating period P2 (Step S3: NO), the threshold setting (Step S4) and the restart of the second timer t2 (Step S5) are excluded.

Thereafter, the CPU 50 performs luminous-state updating (Step S6). The luminous-state updating denotes processing in which the luminous color state and the turn-on/turn-off state of the plurality of light sources 30 forming the display portion 12 are updated. After completing the luminous-state updating, the CPU 50 stands ready until the value (counted time) of the first timer t1 reaches a luminous-state updating period P1 (for example, several milliseconds) (Step S7). If the value of the first timer t1 reaches the luminous-state updating period P1 (Step S7: YES), the CPU 50 resets the value of the first timer t1 at the initial value (for example, zero), and restarts time-counting by means of the first timer t1 (Step S8). For the subsequent processing, the process returns to Step S3.

As described above, the CPU 50 updates the display state of the display portion 12 with each luminous-state updating period P1, and updates the temperature threshold values TB(1) to Tb(9) and the liquid-level height threshold values HB(1) to HB(4) with each threshold updating period P2.

Figure 6:
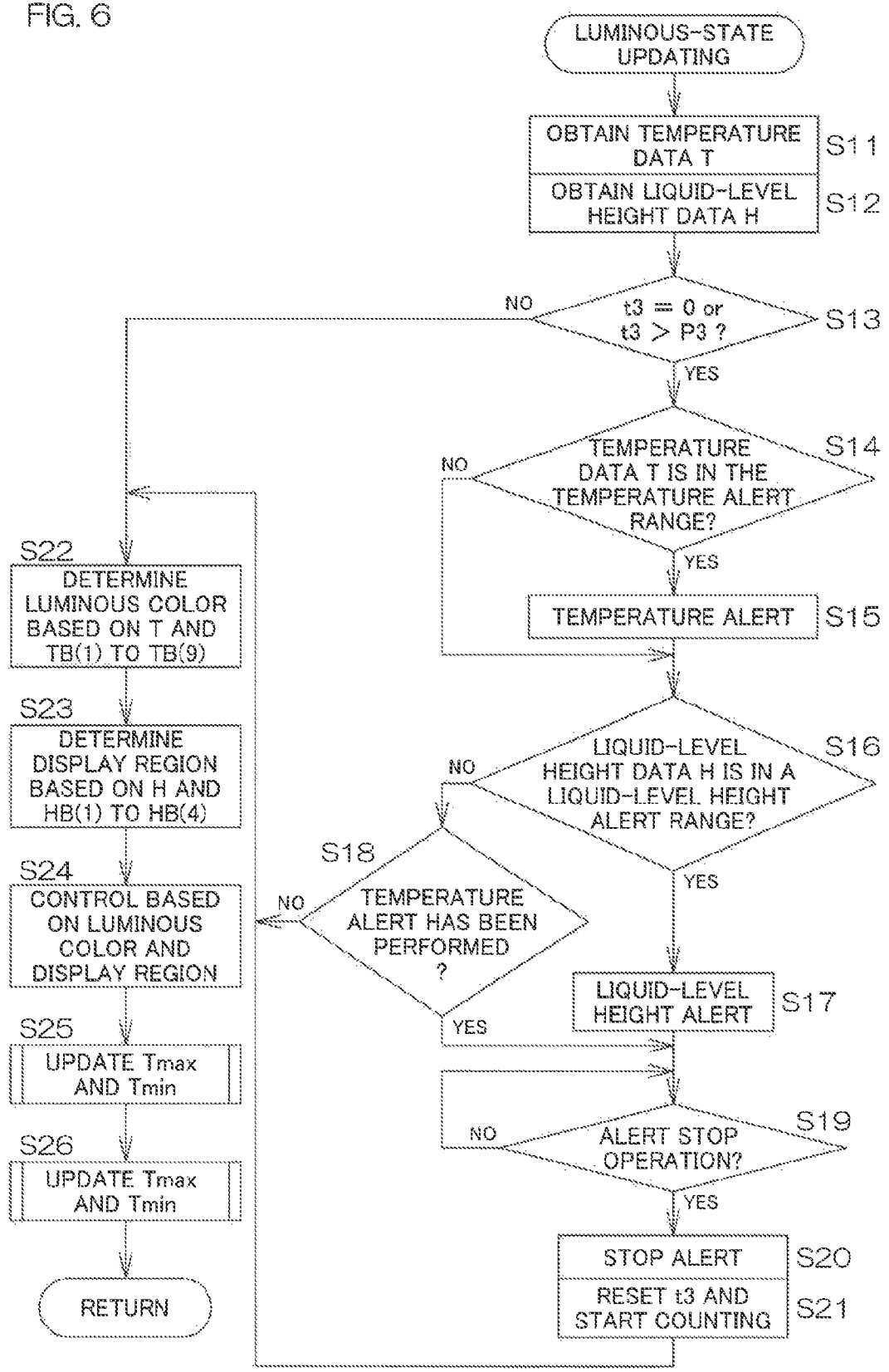
FIG. 6 is a flowchart to describe a concrete example of luminous-state updating.

FIG. 6 is a flowchart to describe a concrete example of the luminous-state updating (Step S6 of FIG. 5). The CPU 50 obtains temperature data T that is obtained by converting a temperature signal output by the temperature sensor 18 by use of the A/D conversion circuit 51 (Step S11). Likewise, the CPU 50 obtains liquid-level height data H that is obtained by converting a liquid-level height signal output by the liquid surface sensor 19 by use of the A/D conversion circuit 51 (Step S12).

The CPU 50 determines whether either the condition that the third timer t3 is zero or the condition that the value of the third timer t3 is larger than the minimum alert interval P3 is satisfied (Step S13). It is preferable to appropriately set the minimum alert interval P3 in accordance with the scale or the peculiarity of equipment to which the liquid monitoring system 1 is applied. For example, if a liquid contained in a large liquid tank provided in a plant is monitored, the minimum alert interval P3 may be set at about several hours. If the tank is a medium-sized liquid tank such as a liquid tank for food products, the minimum alert interval P3 may be set at about several tens of minutes. If the tank is a small-sized liquid tank or is a tank storing a highly dangerous liquid, the minimum alert interval P3 may be set at about a few minutes or at a settable minimum time (for example, control period) or at zero. It should be noted that the third timer t3 is initialized at zero in initialization immediately after the power source of the signal display lamp 10 is turned on (Step S1 of FIG. 5).

In Step S13, if either one of the conditions is satisfied (Step S13: YES), the CPU 50 performs alerting (steps S14 to S17). Specifically, the CPU 50 determines whether the temperature data T is in a temperature alert range (Step S14). The CPU 50 further determines whether the liquid-level height data H is in a liquid-level height alert range (Step S16). If the temperature data T is in the temperature alert range (Step S14: YES), the CPU 50 performs temperature alerting (Step S15). Specifically, the CPU 50 sets the luminous color data at alert luminous color data. If the liquid-level height data H is in the liquid-level height alert range (Step S16: YES), the CPU 50 performs liquid-level height alerting (Step S17). Specifically, the CPU 50 sets alert display region data as the display region data.

If either alerting is performed (Step S18: YES or after Step S17), the CPU 50 waits for an alert stop operation performed by a user (Step S19). The alert stop operation is, for example, the operation of the reset switch 9. The user performs an operation to remove the causes of an alert occurrence, and then operates the reset switch 9. If the alert stop operation is performed, the CPU 50 stops alerting (Step S20). Furthermore, the CPU 50 resets the value of the third timer t3 at the initial value (for example, zero), and restarts time-counting by means of the third timer t3 (Step S21).

Thereafter, the CPU 50 performs luminous-color determining (Step S22) and display-region determining (Step S23). In Step S13, if the value of the third timer t3 is not zero and if the value of the third timer t3 is equal to or less than the minimum alert interval P3, the luminous-color determining (Step S22) and the display-region determining (Step S23) are performed without performing the processing operations of steps S14 to S21. The value of the third timer t3 is the initial value (for example, zero) until first alerting (steps S15 and S17) is stopped after the first alerting (steps S15 and S17) is performed by turning on the power source of the signal display lamp 10. If the temperature data T is a value outside the temperature alert range (Step S14: NO) and if the liquid-level height data H is a value outside the liquid surface alert range (Step S16: NO), the CPU 50 performs the luminous-color determining (Step S22) and the display-region determining (Step S23) without performing the processing operations of steps S15, S17, and S19 to S21 (Step S18: NO).

In the luminous-color determining (Step S22), the CPU 50 compares the temperature data T with the first to ninth temperature threshold values TB(1) to TB(9), and, based on its comparison result, generates luminous-color data that shows any one of the first to tenth luminous colors C1 to C10. In display-region determining (Step S23), the CPU 50 compares the liquid-level height data H with the first to fourth liquid-level height threshold values HB(1) to HB(4), and, based on its comparison result, generates display region data that shows any one of the first to fifth liquid-level height regions R1 to R5. These luminous-color data and display region data generated thereby are given to the display portion control unit 16 (Step S24). The luminous color and turn-on/turn-off of each light source 30 of the luminous division 20 forming the display portion 12 are controlled by the operation of the display portion control unit 16.

Thereafter, the CPU 50 performs updating the minimum temperature Tmin and the maximum temperature Tmax (Step S25) and updating the minimum liquid-level height Hmin and the maximum liquid-level height Hmax (Step S26).

Figure 7:
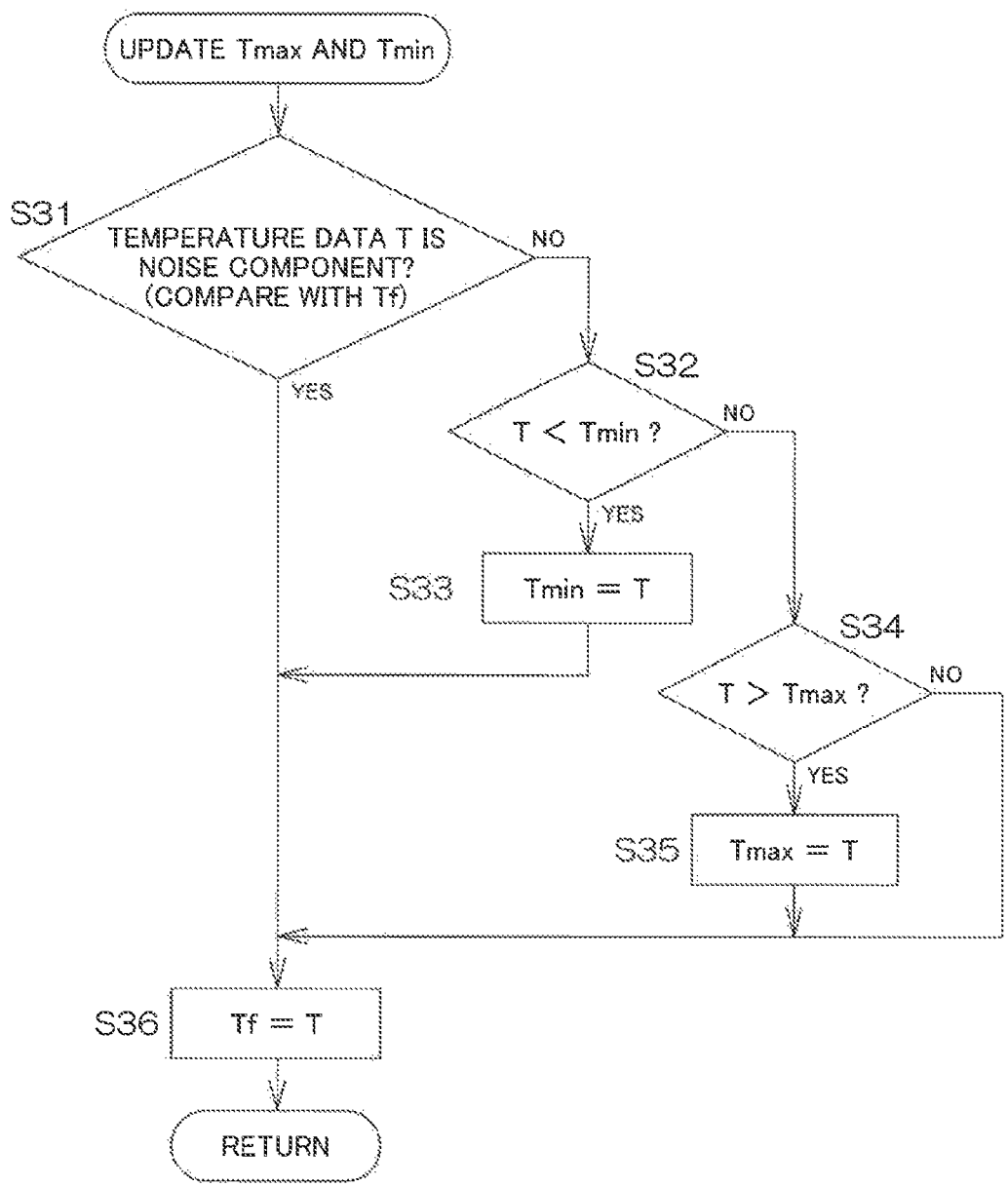
FIG. 7 is a flowchart to describe a concrete processing example in which the minimum temperature and the maximum temperature are updated.

FIG. 7 is a flowchart to describe a concrete processing example in which the minimum temperature and the maximum temperature are updated (Step S25 of FIG. 6). The process of updating the minimum temperature and the maximum temperature is the process of finding the minimum temperature and the maximum temperature that are detected by the temperature sensor 18 during the threshold updating period P2. The CPU 50 first makes a comparison between the last value Tf and the present value T of temperature data that is output with each sampling period in the A/D conversion circuit 51, and determines whether the present temperature data T is a noise component or not (Step S31). For example, if the change from the last value Tf is extremely great (if the change therefrom is steep), it is possible to determine that the present temperature data T is a noise component. In more detail, if |T−Tf|>dTB (dTB is a threshold value for the amount of change), the CPU 50 may determine that the present temperature data T is a noise component. Additionally, if |T−Tf|>a|Tmax−Tmin| ("a" is a positive constant), the CPU 50 may determine that the present temperature data T is a noise component. Still additionally, the CPU 50 may calculate the predictive value of the present value T from past temperature data T according to regression analysis, and may determine that the temperature data T is a noise component if a difference between the predictive value and temperature data T obtained from the temperature sensor 18 is larger than a predetermined threshold value.

If the temperature data T is a noise component (Step S31: YES), the present temperature data T is substituted for the last value Tf that should be used in the following control period, and the process is finished (Step S36).

If it is determined that the present temperature data T is not a noise component (Step S31: NO), the CPU 50 makes a comparison between the previous minimum temperature Tmin and the temperature data T (Step S32). If T<Tmin (Step S32: YES), the present temperature data T is substituted for the minimum temperature Tmin (Step S33), and the minimum temperature Tmin is updated. Thereafter, the process proceeds to Step S36. If T≥Tmin (Step S32: NO), the CPU 50 does not update the minimum temperature Tmin, and makes a comparison between the previous maximum temperature Tmax and the temperature data T (Step S34). If T>Tmax (Step S34: YES), the temperature data T is substituted for the maximum temperature Tmax (Step S35), and the maximum temperature Tmax is updated. Thereafter, the process proceeds to Step S36. If T≤Tmax (Step S34: NO), the CPU 50 does not update the maximum temperature Tmax, and the process proceeds to Step S36. These process steps are repeatedly performed, and, as a result, the minimum temperature Tmin and the maximum temperature Tmax are updated to each value according to detection values of the temperature sensor 18, continually.

Figure 8:
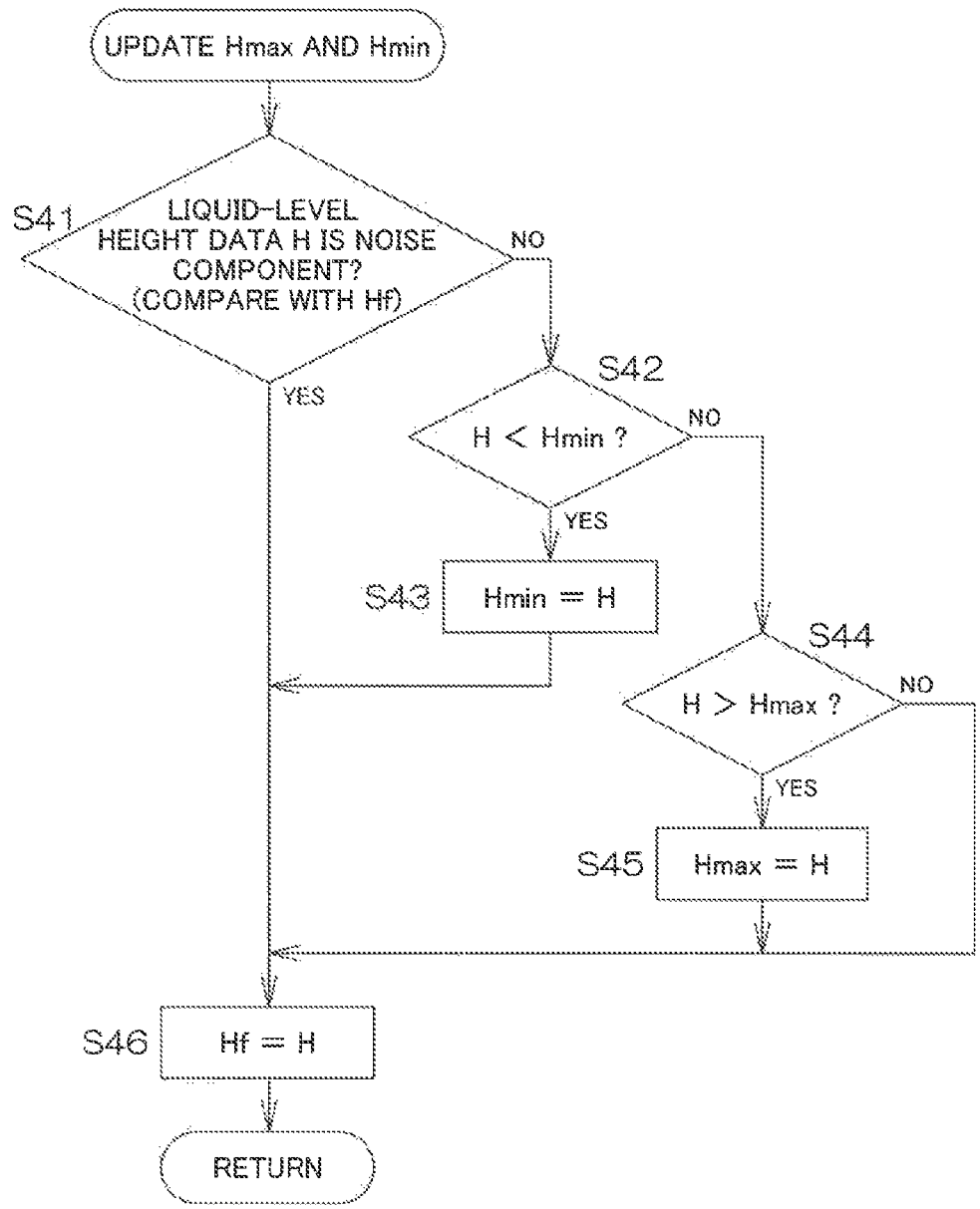
FIG. 8 is a flowchart to describe a concrete processing example in which the minimum liquid-level height and the maximum liquid-level height are updated.

FIG. 8 is a flowchart to describe a concrete processing example in which the minimum liquid-level height and the maximum liquid-level height are updated (Step S26 of FIG. 6). The process of updating the minimum liquid-level height and the maximum liquid-level height is the process of finding the minimum liquid-level height and the maximum liquid-level height that are detected by the liquid surface sensor 19 during the threshold updating period P2. The CPU 50 first makes a comparison between the last value Hf and the present value H of liquid-level height data that is output with each sampling period in the A/D conversion circuit 51, and determines whether the present liquid-level height data H is a noise component or not (Step S41). For example, if the change from the last value Hf is extremely great (if the change therefrom is steep), it is possible to determine that the present liquid-level height data H is a noise component. In more detail, if |H−Hf|>dHB (dHB is a threshold value for the amount of change), the CPU 50 may determine that the present liquid-level height data H is a noise component. Additionally, if |H−Hf|>b|Hmax−Hmin| (b is a positive constant), the CPU 50 may determine that the present liquid-level height data H is a noise component. Still additionally, the CPU 50 may calculate the predictive value of the present value H from past liquid-level height data H according to regression analysis, and may determine that the liquid-level height data H is a noise component if a difference between the predictive value and liquid-level height data H obtained from the liquid surface sensor 19 is larger than a predetermined threshold value.

If the liquid-level height data H is a noise component, the present liquid-level height data H is substituted for the last value Hf that should be used in the following control period, and the process is finished (Step S46).

If it is determined that the present liquid-level height data H is not a noise component (Step S41: NO), the CPU 50 makes a comparison between the previous minimum liquid-level height Hmin and the liquid-level height data H (Step S42). If H<Hmin (Step S42: YES), the present liquid-level height data H is substituted for the minimum liquid-level height Hmin (Step S43), and the minimum liquid-level height Hmin is updated. Thereafter, the process proceeds to Step S46. If H≥Hmin (Step S42: NO), the CPU 50 does not update the minimum liquid-level height Hmin, and makes a comparison between the previous maximum liquid-level height Hmax and the liquid-level height data H (Step S44). If H>Hmax (Step S44: YES), the liquid-level height data H is substituted for the maximum liquid-level height Hmax (Step S45), and the maximum liquid-level height Hmax is updated. Thereafter, the process proceeds to Step S46. If H≤Hmax (Step S44: NO), the CPU 50 does not update the maximum liquid-level height Hmax, and the process proceeds to Step S46. These process steps are repeatedly performed, and, as a result, the minimum liquid-level height Hmin and the maximum liquid-level height Hmax are updated to each value according to detection values of the liquid surface sensor 19, continually.

FIG. 9 is a flowchart to describe a concrete example of threshold setting (Step S4 of FIG. 5), and chiefly shows the operation of the display color threshold updating portion 55 and the operation of the display region threshold updating portion 56.

Based on the minimum temperature Tmin and the maximum temperature Tmax, the CPU 50 calculates first to ninth temperature threshold values TB(1) to TB(9), and stores these values in the nonvolatile memory 521 (Step S51). The first to ninth temperature threshold values TB(1) to TB(9) may be set so as to, for example, equally divide an interval between the minimum temperature Tmin and the maximum temperature Tmax. For example, the temperature threshold value TB(n) may be fixed according to the following equation (1). In the equation, n=1, 2, 9. Additionally, "10" of the denominator of the equation (1) designates the number of temperature intervals divided by the temperature threshold value.

$$TB(n)=Tmin+n(Tmax-Tmin)/10 \quad (1)$$

Likewise, based on the minimum liquid-level height Hmin and the maximum liquid-level height Hmax, the CPU 50 calculates first to fourth liquid-level height threshold values HB(1) to HB(4), and stores these values in the nonvolatile memory 521 (Step S52). The first to fourth liquid-level height threshold values HB(1) to HB(4) may be set so as to, for example, equally divide an interval between the minimum liquid-level height Hmin and the maximum liquid-level height Hmax. For example, the liquid-level height threshold value HB(k) may be fixed according to the following equation (2). In the equation (2), k=1, 2, 4. Additionally, "5" of the denominator of the equation (2) designates the number of liquid-level height regions divided by the liquid-level height threshold value.

$$HB(k)=Hmin+k(Hmax-Hmin)/5 \quad (2)$$

When the setting of the temperature threshold values TB(1) to TB(9) and the liquid-level height threshold values HB(1) to HB(4) is finished in this way, the CPU 50 resets the minimum temperature Tmin, the maximum temperature Tmax, the minimum liquid-level height Hmin, and the maximum liquid-level height Hmax at their initial values, respectively (Step S53). Preferably, the initial value of the minimum temperature Tmin is set at such a large value as not to be conceived in ordinary measurement. Preferably, the initial value of the maximum temperature Tmax is set at such a small value as not to be conceived in ordinary measurement. Preferably, the initial value of the minimum liquid-level height Hmin is set at such a large value as not to be conceived in ordinary measurement. Preferably, the initial value of the maximum liquid-level height Hmax is set at such a small value as not to be conceived in ordinary measurement.

Figure 10C:
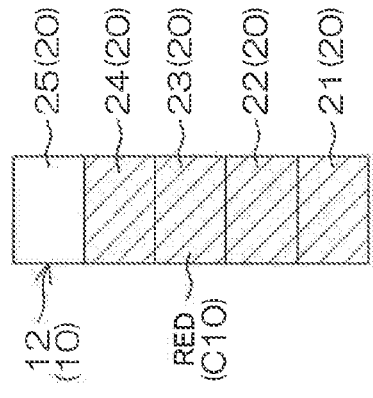
FIG. 10A, FIG. 10B, and FIG. 10C are descriptive views showing an example of display by means of the signal display lamp.
Figure 10B:
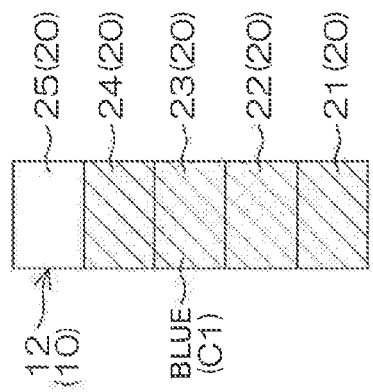
Figure 10A:
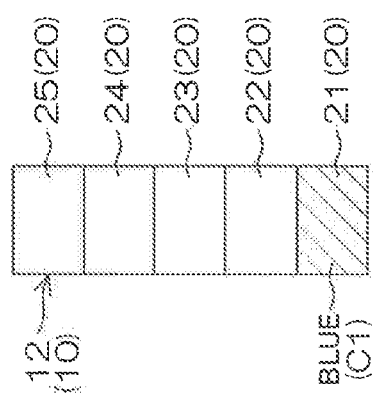

FIG. 10A to FIG. 10C are descriptive views showing an example of display.

As illustrated in FIG. 10A and FIG. 10B, the number of lighting luminous divisions 20 is increased in order from the lowest in proportion to an increase in the liquid-level height, and the liquid-level height is represented by the length (height) of a lighting part formed by the luminous division 20 being in a lighting state shown by the oblique line in the drawing. In other words, the liquid-level height is represented by changing the position and the size of a colored display region being in a luminous state. On the other hand, as illustrated in FIG. 10B and FIG. 10C, the luminous color of the display region being in a luminous state is changed in a "blue→ . . . →red" manner in proportion to an increase in temperature. This makes it possible to represent the highness or lowness in temperature.

The display state of FIG. 10A corresponds to, for example, a case in which the temperature data T is less than the first temperature threshold value TB(1), and the liquid-level height data H is less than the first liquid-level height threshold value HB(1). Therefore, only the lowest luminous division 21 is brought into a lighting state so as to correspond to the first liquid-level height region R1 (see FIG. 4), and its luminous color is a first luminous color C1 (see FIG. 3, for example, blue). The luminous divisions 22 to 25 are brought into a turned-off state.

The display state of FIG. 10B corresponds to, for example, a case in which the temperature data T is less than the first temperature threshold value TB(1), and the liquid-level height data H is equal to or larger than the third liquid-level height threshold value HB(3) and is less than the fourth liquid-level height threshold value HB(4). Therefore, the lowest luminous division 21 to the fourth luminous division 24 are brought into a lighting state so as to correspond to the fourth liquid-level height region R4 (see FIG. 4), and its luminous color is the first luminous color C1 (see FIG. 3, for example, blue). The luminous division 25 is brought into a turned-off state.

The display state of FIG. 10C corresponds to, for example, a case in which the temperature data T is equal to or larger than the ninth temperature threshold value TB(9), and the liquid-level height data H is equal to or larger than the third liquid-level height threshold value HB(3) and is less than the fourth liquid-level height threshold value HB(4). Therefore, the lowest luminous division 21 to the fourth luminous division 24 are brought into a lighting state so as to correspond to the fourth liquid-level height region R4 (see FIG. 4), and its luminous color is the tenth luminous color C10 (see FIG. 3, for example, red). The luminous division 25 is brought into a turned-off state.

FIG. 11A to FIG. 11C show another display example. In this example, the liquid-level height is represented by the light emission of one luminous division 20. Specifically, one luminous division 20 having a height according to the liquid-level height is brought into a luminous state. Accordingly, the liquid-level height is represented by the height of the luminous division 20 being in a luminous state. In other words, in this example, the liquid-level height is represented by changing only the position of the display region while setting the size of the display region as being unchanged. The luminous color conforms to highness or lowness in temperature.

The display state of FIG. 11A corresponds to, for example, a case in which the temperature data T is less than the first temperature threshold value TB(1), and the liquid-level height data H is less than the first liquid-level height threshold value HB(1). Therefore, only the lowest luminous division 21 is brought into a lighting state so as to correspond to the first liquid-level height region R1 (see FIG. 4), and its luminous color is the first luminous color C1 (see FIG. 3, for example, blue). The luminous divisions 22 to 24 are brought into a turned-off state.

The display state of FIG. 11B corresponds to, for example, a case in which the temperature data T is less than the first temperature threshold value TB(1), and the liquid-level height data H is equal to or larger than the second liquid-level height threshold value HB(2) and is less than the third liquid-level height threshold value HB(3). Therefore, only the luminous division 23 that is the third from the lowest is brought into a lighting state so as to correspond to the third liquid-level height region R3 (see FIG. 4), and its luminous color is the first luminous color C1 (see FIG. 3, for example, blue). The luminous divisions 21, 22, 24, and 25 are brought into a turned-off state.

The display state of FIG. 11C corresponds to, for example, a case in which the temperature data T is less than the first temperature threshold value TB(1), and the liquid-level height data H is equal to or larger than the fourth liquid-level height threshold value HB(4). Therefore, only the topmost luminous division 25 is brought into a lighting state so as to correspond to the fifth liquid-level height region R5 (see FIG. 4), and its luminous color is the first luminous color C1 (see FIG. 3, for example, blue). The luminous divisions 21 to 24 are brought into a turned-off state.

FIG. 12 shows an example of a temperature alert display (Step S15 of FIG. 6), in which the temperature has reached an alert range. In this example, the display color in the luminous division 20 to be brought into a luminous state is changed in order from the first luminous color C1 to the tenth luminous color C10, and the display color is circulatorily changed so as to return to the first luminous color C1 when the luminous color becomes the tenth luminous color C10 that is the last display color. In other words, the alert luminous-color data is luminous-color data that appoints the luminous colors ranging from the first luminous color C1 to the tenth luminous color C10, for example, sequentially and circulatorily at regular intervals of time. This makes it possible for the display color to change circulatorily from a color corresponding to low temperature toward a color corresponding to high temperature, and makes it possible to effectively impart the fact that the temperature is in an alert range (for example, a high-temperature region that exceeds a predetermined temperature alert threshold value). Desirably, the size and/or the position of the display region to be brought into a luminous state comply with the highness or lowness of the liquid-level height (see FIG. 4, FIGS. 10A to 10C, and FIGS. 11B and 11C).

FIG. 13 shows an example of a liquid-level height alert display (Step S17 of FIG. 6), in which the liquid-level height has reached an alert range. In this example, the number of luminous divisions 20 to be brought into a luminous state is increased in order from the lowest, and the display color is circulatorily changed so as to return to the luminous state of only the first luminous division 20 when all luminous divisions come into a luminous state. In other words, the alert display region data is display region data that increases the number of luminous divisions to be brought into a luminous state until the luminous region reaches the topmost luminous division from the lowest luminous division, for example, sequentially and circulatorily at regular intervals of time. This makes it possible for the length of the luminous region extending upwardly from the lowest to change circulatorily, and makes it possible to effectively impart the fact that the liquid-level height is in an alert range. Desirably, the luminous color complies with the highness or lowness of the temperature (see FIG. 3, FIG. 10B, and FIG. 10C).

Instead of circulatorily changing the length of a region being in a luminous state, the luminous divisions may be selected one by one circulatorily and sequentially from the lowest and may be displayed so that the position of one luminous division to be brought into a luminous state moves circulatorily from the lowest toward the topmost.

As described above, according to the arrangement of the present preferred embodiment, the display portion 12 of the signal display lamp 10 has a plurality of luminous divisions (21 to 25), and each luminous division 20 is capable of emitting light individually in a plurality of luminous colors. Therefore, the display portion 12 is capable of performing display in a plurality of colors, and the position and the size of a display region having each display color are capable of being variably set. The temperature (first information, first properties, first physical quantity) of the liquid 5 stored in the liquid tank 2 is detected by the temperature sensor 18, and the liquid-level height (liquid quantity: second information, second properties, second physical quantity) of the liquid is detected by the liquid surface sensor 19. The output signal of the temperature sensor 18 is converted into temperature data T by means of the A/D conversion circuit 51, and the output signal of the liquid surface sensor 19 is converted into liquid-level height data H by means of the A/D conversion circuit 51. The display color determining portion 53 compares the temperature data T with a plurality of temperature threshold values TB(1) to TB(9), and, based on a comparison result, determines one luminous color from the plurality of luminous colors C1 to C10. The display region determining portion 54 compares the liquid-level height data H with a plurality of liquid-level height threshold values HB(1) to HB(4), and, based on a comparison result, selects one liquid-level height region from the plurality of liquid-level height regions R1 to R5. Thereafter, based on the liquid-level height region selected therefrom, the display region determining portion 54 determines a luminous division to be allowed to emit light in a luminous color determined by the display color determining portion 53. In this way, the position and/or the size (length) of a luminous region (display region) in the luminous color determined by the display color determining portion 53 are determined in accordance with the liquid-level height region. Light emission control data that includes luminous-color data and display region data that respectively indicate the luminous color and the display region determined thereby is delivered to the display portion control unit 16. The display portion control unit 16 controls the luminous color and the turn-on/turn-off of the light source 30 (31 to 35) of each luminous division 20 (21 to 25) in accordance with the light emission control data.

In this way, it is possible to represent the temperature (first information, first properties, first physical quantity) of the liquid 5 by means of a display color, and it is possible to represent the liquid-level height (second information, second properties, second physical quantity) of the liquid 5 by means of the position or the size of the display region of the display color. Moreover, it is possible to employ various display modes because the display region or the display position of each display color is variable. Accordingly, it is possible to increase the quantity of transmittable information and improve the reliability of information transmission.

Additionally, in the present preferred embodiment, the A/D conversion circuit 51 forming a signal input interface that converts the output signal of the sensor unit 6 into data indicating the physical quantity (temperature data and liquid-level height data) is a component of the signal conversion unit 15 along with the CPU 50 that functions as the display color determining portion 53, the display region determining portion 54, etc. This signal conversion unit 15 has a form as an add-on unit that is detachably attached to the signal display lamp 10. Therefore, as a result of attaching the signal conversion unit 15 serving as an add-on unit, the signal display lamp 10 of the present preferred embodiment is capable of, in a retrofitting manner, adding a function to determine a display color based on information (first information) detected by the first sensor (for example, temperature sensor), and to determine and display the position or the size of a display region in the display color determined thereby based on information (second information) detected by the second sensor (for example, liquid-level height sensor).

Additionally, in the present preferred embodiment, the minimum temperature Tmin and the maximum temperature Tmax are monitored, and, in accordance therewith, the temperature threshold values TB(1) to TB(9) (example of display color switching threshold values) are updated with each threshold updating period P2. Accordingly, it is possible to realize display according to a recent change in the temperature (first physical quantity) of the liquid 5. Additionally, the minimum liquid-level height Hmin and the maximum liquid-level height Hmax are monitored, and, in accordance therewith, the liquid-level height threshold values HB(1) to HB(4) are updated with each threshold updating period P2. Accordingly, it is possible to realize display according to a recent change in the liquid-level height (second physical quantity) of the liquid 5.

Still additionally, in the present preferred embodiment, when temperature data T reaches a value in a predetermined temperature alert range, a plurality of display colors are selected circulatorily, and the display color changes periodically. This makes it possible to perform an alert display concerning the temperature (first physical quantity) of the liquid 5 by means of a circulatory change in the display color. Additionally, when liquid-level height data H reaches a value in a predetermined liquid-level height alert range, the position or the size of a luminous region (display region) by a luminous color determined by the display color determining portion 53 changes periodically. This makes it possible to perform an alert display concerning the liquid-level height (second physical quantity) by means of a circulatory change in position or in size of the display region. Accordingly, concerning the temperature (first physical quantity) and the liquid-level height (second physical quantity), it is possible to display their respective alerts (warnings).

FIG. 14 is a flowchart to describe processing in a signal display lamp according to another preferred embodiment (second preferred embodiment) of the present invention. In FIG. 14, the same reference signs are given to portions equivalent to those of the steps shown in FIG. 5. In the present preferred embodiment, threshold values TB(1) to TB(9) and HB(1) to HB(4), which are used for a change in the display region corresponding to the liquid-level height and for a change in the display color corresponding to the temperature, are all fixed values, and processing operations (steps S3 to S5) with respect to threshold-value setting are excluded. The threshold values TB(1) to TB(9) and HB(1) to HB(4) that are fixed values, respectively, are pre-stored in, for example, the nonvolatile memory 521. These fixed threshold values TB(1) to TB(9) and HB(1) to HB(4) can be changed by use of the external information instrument 8 when needed. In luminous-state updating (FIG. 6), the process (Step S25) of updating the minimum temperature and the maximum temperature and the process (Step S26) of updating the minimum liquid-level height and the maximum liquid-level height may be excluded. In accordance therewith, in Step S1, the initialization of the second timer t2 and the initialization of the minimum temperature Tmin, the maximum temperature Tmax, the minimum liquid-level height Hmin, and the maximum liquid-level height Hmax may be excluded.

By these processing operations, the signal display lamp 10 performs not a relative temperature display by the minimum temperature and the maximum temperature but an operation to represent an absolute temperature display by a display color. Likewise, the signal display lamp 10 performs not a relative liquid-level height display according to the minimum liquid-level height and the maximum liquid-level height but an operation to represent an absolute liquid-level height display by the position and/or the size of a display region.

Figure 15:
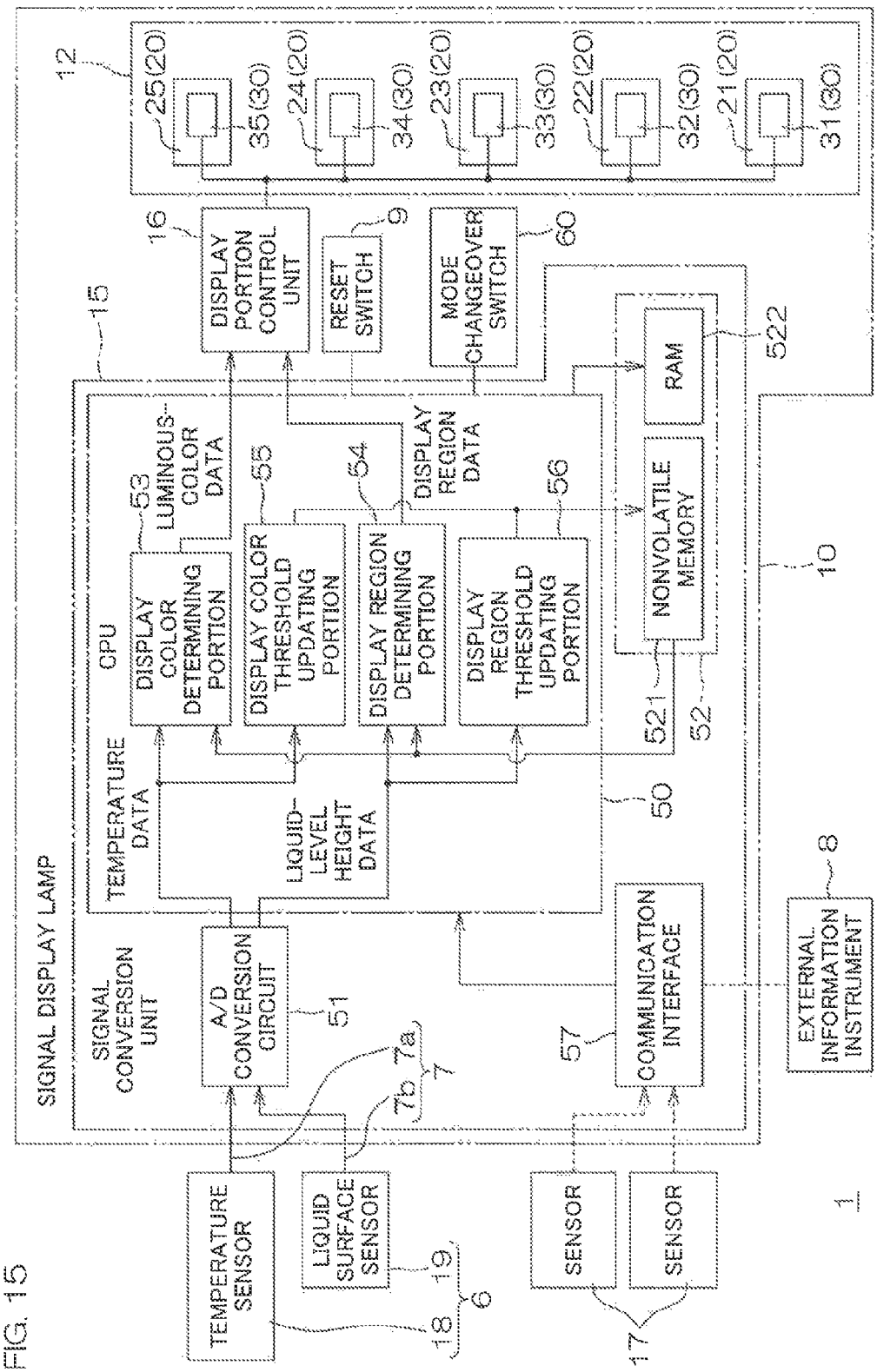
FIG. 15 is a block diagram to describe an electric configuration of a signal display lamp according to still another preferred embodiment of the present invention.

FIG. 15 is a block diagram to describe an electric configuration of a signal display lamp according to still another preferred embodiment (third preferred embodiment) of the present invention. In FIG. 15, the same reference signs are given to portions equivalent to those of FIG. 2. In the present preferred embodiment, a mode changeover switch 60 is connected to the signal conversion unit 15. The mode changeover switch 60 is a switch that performs switching between a relative display mode and an absolute display mode. The relative display mode is a mode in which the operation described in the first preferred embodiment mentioned above is performed (see FIG. 5, etc.). The absolute display mode is a mode in which the operation described in the second preferred embodiment mentioned above is performed (see FIG. 14, etc.).

The CPU 50 performs display according to either the relative display mode or the absolute display mode, which depends on a set state of the mode changeover switch 60.

In the absolute display mode, it is possible to display an absolute state of the liquid 5 stored in the liquid tank 2 by use of temperature threshold values TB(1) to TB(9) that are fixed values and liquid-level height threshold values HB(1) to HB(4) that are fixed values. On the other hand, in the relative display mode, temperature threshold values TB(1) to TB(9) are variably set in accordance with the minimum temperature Tmin and the maximum temperature Tmax, and liquid-level height threshold values HB(1) to HB(4) are variably set in accordance with the minimum liquid-level height Hmin and the maximum liquid-level height Hmax. Accordingly, in the relative display mode, display dynamically changes, and therefore it is possible to dynamically represent a change in the state of the liquid 5.

It is also possible to regard mode switching performed by turning the mode changeover switch 60 as a change in the resolving power of display or in the dynamic range. From this viewpoint, it can be said that the mode changeover switch is a display-resolving-power switching means that switches display resolving power or a dynamic range switching means that switches a dynamic range.

FIG. 16 is a view to describe an example of display of a signal display lamp according to still another preferred embodiment (fourth preferred embodiment) of the present invention. In the description of the present preferred embodiment, reference is again made to FIG. 1, FIG. 2, and FIG. 4. In the present preferred embodiment, the signal display lamp 10 displays first information that indicates whether the liquid-level height H in the liquid tank 2 is a value within a predetermined range by means of a luminous color, and displays the liquid-level height in the liquid tank 2 as second information by means of the position and/or the size of a luminous region (display region) by that luminous color.

In detail, the CPU 50 compares the liquid-level height data H with the liquid-level height threshold values HB(1) to HB(4) (see FIG. 4), and specifies one liquid-level height region R1 to R5 corresponding to the liquid-level height data H. When the liquid-level height regions R1 and R2 each of which indicates a low liquid level are specified, the display color determining portion 53 selects the first luminous color C1 (for example, green), and generates luminous-color data that shows the first luminous color C1. When the liquid-level height regions R3 and R4 each of which indicates an intermediate liquid level are specified, the display color determining portion 53 selects the second luminous color C2 (for example, yellow), and generates luminous-color data that shows the second luminous color C2. When the liquid-level height region R5 that indicates a high liquid level is specified, the display color determining portion 53 selects the third luminous color C3 (for example, red), and generates luminous-color data that indicates the third luminous color C3.

On the other hand, if the liquid-level height data H is less than the first liquid-level height threshold value HB(1), the display region determining portion 54 generates display region data that indicates the first liquid-level height region R1 in the same way as in the first preferred embodiment. If the liquid-level height data H is equal to or larger than the first liquid-level height threshold value HB(1) and is less than the second liquid-level height threshold value HB(2), the display region determining portion 54 generates display region data that indicates the second liquid-level height region R2. Likewise, if the liquid-level height data H is equal to or larger than the second liquid-level height threshold value HB(2) and is less than the third liquid-level height threshold value HB(3), the display region determining portion 54 generates display region data that indicates the third liquid-level height region R3. If the liquid-level height data H is equal to or larger than the third liquid-level height threshold value HB(3) and is less than the fourth liquid-level height threshold value HB(4), the display region determining portion 54 generates display region data that indicates the fourth liquid-level height region R4. If the liquid-level height data H is equal to or larger than the fourth liquid-level height threshold value HB(4), the display region determining portion 54 generates display region data that indicates the fifth liquid-level height region R5. The threshold values HB(1) to HB(4) may be updated periodically in the same way as in the first preferred embodiment, or may be each set at a fixed value in the same way as in the second preferred embodiment. Alternatively, switching between the absolute display mode and the relative display mode may be performed by the mode changeover switch 60 in the same way as in the third preferred embodiment.

If the luminous-color data and the display region data generated in this way are given to the display portion control unit 16, a luminous region having a position and a size according to a liquid-level height will emit light in a luminous color according to a liquid level region as shown in FIG. 16A to FIG. 16C.

In the examples of FIG. 16A to FIG. 16C, the number of lighting luminous divisions 20 is increased in order from the lowest in proportion to an increase in the liquid-level height, and the liquid-level height is represented by the length (height) of a lighting part formed by the luminous division 20 being in a lighting state shown by the oblique line in the drawing. In other words, the liquid-level height is represented by changing the position and the size of a colored display region being in a luminous state. On the other hand, the luminous color of the display region being in a luminous state is changed in a "green→yellow→red" manner in proportion to an increase in the height of the liquid level region. This makes it possible to represent the highness or lowness in the liquid level region, and makes it possible to perform display that facilitates an intuitive grasp of the liquid level. In more detail, it is possible to impart more vivid information in proportion to, for example, an increase in the liquid level.

The display state of FIG. 16A corresponds to the case of the first liquid-level height region R1 (low liquid level region). Therefore, only the lowest luminous division 21 is brought into a lighting state so as to correspond to the first liquid-level height region R1 (see FIG. 4), and its luminous color is the first luminous color C1 (for example, green). The luminous divisions 22 to 25 are each brought into a turned-off state.

The display state of FIG. 16B corresponds to the case of the third liquid-level height region R3 (intermediate liquid level region). Therefore, the luminous divisions 21 to 23 from the lowest to the third are each brought into a lighting state so as to correspond to the third liquid-level height region R4 (see FIG. 4), and its luminous color is the second luminous color C2 (for example, yellow). The luminous divisions 24 and 25 are each brought into a turned-off state.

The display state of FIG. 16C corresponds to the case of the fifth liquid-level height region R5 (high liquid level region). Therefore, the luminous divisions 21 to 25 from the lowest to the fifth are each brought into a lighting state so as to correspond to the fifth liquid-level height region R5 (see FIG. 4), and its luminous color is the third luminous color C3 (for example, red).

Although the four preferred embodiments of the present invention have been described as above, the present invention can be embodied in other modes. Other preferred embodiments will be each hereinafter enumerated as an example.

(1) As described in the first to third preferred embodiments, the highness or lowness of a temperature is represented by a luminous color, and the liquid-level height is represented by the position and/or the size of a luminous region. However, the liquid-level height can be represented by a luminous color, and the highness or lowness of a temperature can be represented by the position and/or the size of a luminous region. Additionally, although display concerning the liquid-level height has been described in the fourth preferred embodiment, display concerning the temperature can be performed in the same way. Additionally, a changeover switch that performs switching between display concerning the liquid-level height and display concerning the temperature may be provided.

(2) As described in the above preferred embodiments, display of a temperature, display of a liquid-level height, display of a liquid level region to which the liquid-level height belongs, etc., are performed. However, the present invention is usable to display a physical quantity, such as temperature, humidity, pressure, power magnitude, power direction, weight, torque, volume, liquid-level height, flow rate, distance, speed, acceleration, time period, sound volume, sound pressure, or data amount, or to display information relative to those physical quantities (for example, region division to which the value of the physical quantity belongs or flow direction of fluid or of data). For example, a temperature (first physical quantity) detected by a temperature sensor can be displayed by a display color, and atmospheric pressure (second physical quantity) detected by an atmospheric pressure sensor can be displayed by the position or the size of a display region. Additionally, the flow direction of data (first information) passing through a specific point (for example, router) of data communication can be displayed by a display color, and its data amount (second information) can be displayed by the position or the size of a display region. Still additionally, information (first information) whether a physical quantity has exceeded a threshold value may be displayed by a display color, and a period of time (second information) that has elapsed after the physical amount exceeds the threshold value may be displayed by the position or the size of a display region. These are merely examples, and the present invention can be applied in order to display at least two kinds of pieces of information, and information to be displayed may be properties other than the physical quantity of an object to be monitored, without being limited to the physical quantity. Different properties of the same object to be monitored are not required to be displayed, and homogeneous or different properties of different objects to be monitored may be displayed. Additionally, the signal display lamp of the present invention may be applied in order to simultaneously provide a plurality of pieces of arbitrary information, without being limited to properties of an object to be monitored.

(3) As described in the above preferred embodiments, a single or a plurality of luminous divisions are each brought into a lighting state in one determined luminous color, and the other luminous divisions are each brought into a turned-off state. However, a luminous division other than luminous divisions that are lit by one determined luminous color may be brought into a lighting state in another luminous color. In other words, two or more luminous colors may be determined, and the position or the size of a luminous region in each luminous color may be set variably.

(4) The number of temperature threshold values, the number of liquid-level height threshold values, etc., described in the above preferred embodiments are merely examples, and the method of setting those numbers described in the above preferred embodiments is merely an example, and an arbitrary number of threshold values may be set, and a method of setting such a number may also be arbitrary.

(5) The number of luminous divisions shown in the above preferred embodiments is one example, and the position or the size of a display region can be changed by providing a plurality of arbitrary numbers of luminous divisions. Additionally, the luminous divisions are not required to be arranged linearly, and may be arranged along a curve, or a plurality of luminous divisions may be arranged two-dimensionally. For example, the display portion may be formed by arranging a plurality of luminous micro-divisions (for example, light emission dots) in a matrix manner. In this case, the display portion may be formed such that the luminous divisions can emit light in a plurality of colors, respectively, and such that the luminous divisions can each controllably emit light. The position or the size of a display region in a determined luminous color can be changed by individually controlling the luminous colors of the respective luminous divisions. The plurality of luminous divisions are arranged in a matrix manner, and therefore the position or the size of the display region can be two-dimensionally changed on a surface to which the luminous divisions are arranged. The plurality of luminous divisions may be arranged along a flat surface, or may be arranged along a curved surface (for example, a cylindrical surface).

(6) Although the position and the size of a luminous region (display region) are changed in, for example, the display example of FIG. 10, only the size of the luminous region may be changed while fixing the gravity center position of the luminous region, depending on the type of information to be expressed.

(7) As described in the above preferred embodiments, a luminous division is controllably turned on/off in a determined luminous color, and yet the brightness of the luminous division may be controlled in the determined luminous color. For example, a display color may be determined based on first information, and the position or the size of a display region in that display color may be determined based on second information, and the brightness of that display region may be determined based on third information. This makes it possible to display three kinds of pieces of information.

(8) In the first preferred embodiment, etc., both the temperature threshold value and the liquid-level height threshold value are updated with each threshold updating period P2. However, either one of the two threshold values may be updated regularly. Additionally, when both threshold values are regularly updated, the updating period of one threshold value may differ from that of the other one.

(9) In the above preferred embodiments, an arrangement is formed so that control parameters (temperature threshold value, liquid-level height threshold value, luminous-state updating period P1, threshold updating period P2, minimum alert interval P3, etc.) and programs stored in the nonvolatile memory 521 can be updated by being connected to the external information instrument 8. However, the same function can be achieved by including, for example, a media reader unit (such as a media slot) to which an external media is attachable. An arrangement may be formed so that, when an external media typified by, for example, a USB memory or a memory card that stores control parameters or update programs is attached to a media reader unit, the control parameters or the programs are automatically updated in response thereto.

Although the preferred embodiments of the present invention have been described in detail as above, these are merely specific examples used to clarify the technical contents of the present invention, and the present invention should not be understood as being limited to these examples, and the scope of the present invention is to be determined solely by the appended claims.

The present application corresponds to Japanese Patent Application No. 2014-017577 filed in the Japan Patent Office on Jan. 31, 2014, and the entire disclosure of the application is incorporated herein by reference.

INDUSTRIAL APPLICABILITY

The present invention is applicable to a signal display lamp that includes a display portion capable of performing display in a plurality of colors.

REFERENCE SIGNS LIST

TB(1) to TB(9): First to ninth temperature threshold values
HB(1) to HB(4): First to fourth liquid-level height threshold values
C1 to C10: First to tenth luminous colors
R1 to R5: First to fifth liquid-level height regions
t1: First timer
t2: Second timer
t3: Third timer
P1: Luminous-state updating period
P2: Threshold updating period
P3: Minimum alert interval
1: Liquid monitoring system
2: Liquid tank
3: Outer shell
4: Liquid containing space
5: Liquid
6: Sensor unit
6a: Detection probe
7, 7a, 7b: Signal wire
8: External information instrument
9: Reset switch (alert release)
10: Signal display lamp
11: Base portion
12: Display portion
13: Axis
14: Wiring board
15: Signal conversion unit
16: Display portion control unit
17: Another sensor
18: Temperature sensor
19: Liquid surface sensor (liquid level sensor)
20: Luminous division
21 to 25: First to fifth luminous divisions
30: Light source
31 to 35: First to fifth light sources
40: Globe
41 to 45: First to fifth globes
50: CPU
51: A/D conversion circuit
52: Memory
521: Nonvolatile memory
522: RAM
53: Display color determining portion
54: Display region determining portion
55: Display color threshold updating portion
56: Display region threshold updating portion
57: Communication interface
60: Mode changeover switch While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A signal display lamp comprising:
a display portion that is configured to provide display in a plurality of display colors and to change a position or a size of a display region in each display color;
an information input interface to which first information and second information are input;
a memory that stores an execution program;
a processor that executes the execution program stored in the memory so as to function as a plurality of function processing portions including a display color determining portion programmed to determine the display color based on the first information input to the information input interface, and a display region determining portion programmed to determine a position or a size of a display region in a display color determined by the display color determining portion based on the second information input to the information input interface; and
a display portion controller configured or programmed to control the display portion based on a display color determined by the display color determining portion and based on a position or a size of a display region determined by the display region determining portion, wherein
the first information is a first physical quantity,
the second information is a second physical quantity that differs in kind from the first physical quantity,
the information input interface accepts input of the first and second quantities,
the display color determining portion is programmed to make a comparison between the first physical quantity and a display color switching threshold value stored in the memory and to determine a display color based on a result of the comparison,
the display region determining portion is programmed to make a comparison between the second physical quantity and a display region changing threshold value stored in the memory and to determine a position or a size of a display region by a display color determined by the display color determining portion based on a result of the comparison, and
the plurality of function processing portions further include a display region threshold updating portion programmed to periodically update the display region changing threshold value with a predetermined display region threshold updating period based on a maximum value and a minimum value of the second physical quantity during the display region threshold updating period.

2. The signal display lamp according to claim 1, wherein at least one of the first physical quantity and the second physical quantity is a physical quantity detected by a sensor.

3. The signal display lamp according to claim 1, wherein the first physical quantity is a temperature of a liquid detected by a temperature sensor, and the second physical quantity is a liquid level of the liquid detected by a liquid level sensor.

4. The signal display lamp according to claim 2 wherein the information input interface includes a signal input interface that converts an output signal of the sensor into a physical quantity and that delivers the physical quantity to the processor,
wherein the signal input interface, the memory and the processor are included in an add-on unit attachable to and detachable from the signal display lamp.

5. The signal display lamp according to claim 1, wherein the information input interface, the memory and the processor are included in a unit attachable to and detachable from the signal display lamp.

6. A signal display lamp comprising:
a display portion that is configured to provide display in a plurality of display colors and to change a position or a size of a display region in each display color;
an information input interface to which first physical quantity and second physical quantity are input, the second physical quantity being different in kind from the first physical quantity;
a memory that stores an execution program;
a processor that executes the execution program stored in the memory so as to function as a plurality of function processing portions including a display color determining portion programmed to determine the display color based on the first physical quantity input to the information input interface, and a display region determining portion programmed to determine a position or a size of a display region in a display color determined by the display color determining portion based on the second physical quantity input to the information input interface; and
a display portion controller configured or programmed to control the display portion based on a display color determined by the display color determining portion and based on a position or a size of a display region determined by the display region determining portion,
wherein the display color determining portion is programmed to make a comparison between the first physical quantity and a display color switching threshold value stored in the memory and to determine a display color based on a result of the comparison,
the display region determining portion is programmed to make a comparison between the second physical quantity and a display region changing threshold value stored in the memory and to determine a position or a size of a display region by a display color determined by the display color determining portion based on a result of the comparison, and
the plurality of function processing portions further include a display color threshold updating portion programmed to periodically update the display color switching threshold value with a predetermined display color threshold updating period based on a maximum value and a minimum value of the first physical quantity during the display color threshold updating period.

7. The signal display lamp according to claim 6, wherein the plurality of function processing portions further include a display region threshold updating portion programmed to periodically update the display region changing threshold value with a predetermined display region threshold updating period based on a maximum value and a minimum value of the second physical quantity during the display region threshold updating period.

8. The signal display lamp according to claim 6, wherein the first physical quantity is a physical quantity detected by a first sensor, the second physical quantity is another physical quantity detected by a second sensor.

9. A signal display lamp comprising:
a display portion that is configured to provide display in a plurality of display colors and to change a position or a size of a display region in each display color;
an information input interface to which first physical quantity and second physical quantity are input, the second physical quantity being different in kind from the first physical quantity;
a memory that stores an execution program;
a processor that executes the execution program stored in the memory so as to function as a plurality of function processing portions including a display color determining portion programmed to determine the display color based on the first physical quantity input to the information input interface, and a display region determining portion programmed to determine a position or a size of a display region in a display color determined by the display color determining portion based on the second physical quantity input to the information input interface; and
a display portion controller configured or programmed to control the display portion based on a display color determined by the display color determining portion and based on a position or a size of a display region determined by the display region determining portion,
wherein the display color determining portion is programmed to circulatorily select a plurality of display colors and to initiate a periodic change of the circulatorily selected display colors when the first physical quantity reaches a predetermined value in a first alert range, and
the display region determining portion is programmed to initiate a periodic change of a position or a size of a display region by a display color determined by the display color determining portion when the second physical quantity reaches a predetermined value in a second alert range.

10. The signal display lamp according to claim 6, wherein at least one of the first physical quantity and the second physical quantity is a physical quantity detected by a sensor.

11. The signal display lamp according to claim 9, wherein at least one of the first physical quantity and the second physical quantity is a physical quantity detected by a sensor.

12. The signal display lamp according to claim 6, wherein the first physical quantity is a temperature of a liquid detected by a temperature sensor, and the second physical quantity is a liquid level of the liquid detected by a liquid level sensor.

13. The signal display lamp according to claim 9, wherein the first physical quantity is a temperature of a liquid detected by a temperature sensor, and the second physical quantity is a liquid level of the liquid detected by a liquid level sensor.

14. The signal display lamp according to claim 10, wherein the information input interface includes a signal input interface that converts an output signal of the sensor into a physical quantity and that delivers the physical quantity to the processor,
wherein the signal input interface, the memory and the processor are included in an add-on unit attachable to and detachable from the signal display lamp.

15. The signal display lamp according to claim 11, wherein the information input interface includes a signal input interface that converts an output signal of the sensor into a physical quantity and that delivers the physical quantity to the processor,
wherein the signal input interface, the memory and the processor are included in an add-on unit attachable to and detachable from the signal display lamp.

16. The signal display lamp according to claim 6, wherein the information input interface, the memory and the processor are included in a unit attachable to and detachable from the signal display lamp.

17. The signal display lamp according to claim 9, wherein the information input interface, the memory and the processor are included in a unit attachable to and detachable from the signal display lamp.

18. The signal display lamp according to claim 9, wherein the display color determining portion is programmed to make a comparison between the first physical quantity and a display color switching threshold value stored in the memory and to determine a display color based on a result of the comparison, and the display region determining portion is programmed to make a comparison between the second physical quantity and a display region changing threshold value stored in the memory and to determine a position or a size of a display region by a display color determined by the display color determining portion based on a result of the comparison.

\* \* \* \* \*